United States Patent
Ogawa et al.

(10) Patent No.: US 9,017,894 B2
(45) Date of Patent: Apr. 28, 2015

(54) FUEL CELL

(75) Inventors: Tetsuya Ogawa, Wako (JP); Yukihiko Kiyohiro, Wako (JP); Koji Dan, Wako (JP); Yuki Yoshimine, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 38 days.

(21) Appl. No.: 13/260,163

(22) PCT Filed: Mar. 16, 2010

(86) PCT No.: PCT/JP2010/054395
§ 371 (c)(1),
(2), (4) Date: Sep. 23, 2011

(87) PCT Pub. No.: WO2010/113630
PCT Pub. Date: Oct. 7, 2010

(65) Prior Publication Data
US 2012/0009498 A1 Jan. 12, 2012

(30) Foreign Application Priority Data

Apr. 2, 2009 (JP) .................................. 2009-090377

(51) Int. Cl.
*H01M 8/24* (2006.01)
*H01M 8/10* (2006.01)
*H01M 8/04* (2006.01)
(Continued)

(52) U.S. Cl.
CPC ............ *H01M 8/248* (2013.01); *H01M 8/0247* (2013.01); *H01M 8/0258* (2013.01); *H01M 8/04067* (2013.01); *H01M 8/243* (2013.01); *H01M 2008/1293* (2013.01); *H01M 2250/20* (2013.01); *Y02E 60/50* (2013.01);
(Continued)

(58) Field of Classification Search
None
See application file for complete search history.

(56) References Cited

U.S. PATENT DOCUMENTS

2005/0142422 A1  6/2005  Homma et al.
2006/0292408 A1* 12/2006  Suh et al. ........................ 429/19
(Continued)

FOREIGN PATENT DOCUMENTS

JP  10-172594  6/1998
JP  2005-85520  3/2005
(Continued)

OTHER PUBLICATIONS

Supplementary European Search Report for Application No. 10758406.2, 9 pages, dated Jul. 20, 2012.
(Continued)

*Primary Examiner* — Patrick Ryan
*Assistant Examiner* — Angela Martin
(74) *Attorney, Agent, or Firm* — Nelson Mullins Riley & Scarborough LLP; Anthony A. Laurentano

(57) ABSTRACT

A fuel cell is provided with a separator that supports an electrolyte/electrode assembly sandwiched therebetween. The separator is provided with: first and second fuel gas supply parts in the center of which fuel gas supply holes are formed; first and second cross-link parts connected to the first and second fuel gas supply parts; and first and second surrounding support parts connected to the first and second cross-link parts. Each first surrounding support part is provided with a set of fuel gas exhaust passages that discharge fuel gas that has gone through a fuel gas passage and been used. The cross-sectional areas of the fuel gas exhaust passages are larger on the downstream sides than on the upstream sides, in terms of the direction of fuel gas flow.

21 Claims, 19 Drawing Sheets

(51) Int. Cl.
*H01M 8/02* (2006.01)
*H01M 8/12* (2006.01)

(52) U.S. Cl.
CPC .............. *Y02E 60/525* (2013.01); *Y02T 90/32* (2013.01); *H01M 8/2465* (2013.01)

(56) References Cited

U.S. PATENT DOCUMENTS

2010/0178593 A1  7/2010  Kiyohiro
2011/0151348 A1  6/2011  Murakami et al.

FOREIGN PATENT DOCUMENTS

| JP | 2006-120589 | 5/2006 | | |
|----|----|----|----|----|
| JP | 2008-47413 | 2/2008 | | |
| WO | 2007/074666 A1 | 7/2007 | | |
| WO | 2007/077724 A1 | 7/2007 | | |
| WO | 2007/089006 A1 | 8/2007 | | |
| WO | WO 2007/089006 A1 * | 8/2007 | .............. | H01M 8/02 |
| WO | 2008/020533 A1 | 2/2008 | | |
| WO | WO 2008/020533 * | 2/2008 | .............. | H01M 8/04 |
| WO | 2009/133779 A1 | 11/2009 | | |
| WO | 2009/133780 A1 | 11/2009 | | |

OTHER PUBLICATIONS

Supplementary European Search Report for Application No. 10758405.4, 9 pages, dated Jul. 20, 2012.

International Search Report for Application No. PCT/JP2010/054395, dated May 18, 2010.

Office Action for U.S. Appl. No. 13/260,097, 15 pages, dated May 20, 2013.

* cited by examiner

→ OXYGEN-CONTAINING GAS
--→ FUEL GAS

FUEL CELL

RELATED APPLICATIONS

This application is a 35 U.S.C. 371 national stage filing of International Application No. PCT/JP2010/054395, filed Mar. 16, 2010, which claims priority to Japanese Patent Application No. 2009-090377 filed on Apr. 2, 2009 in Japan. The contents of the aforementioned applications are hereby incorporated by reference.

TECHNICAL FIELD

The present invention relates to a fuel cell formed by sandwiching electrolyte electrode assemblies between separators. Each of the electrolyte electrode assemblies includes an anode, a cathode, and an electrolyte interposed between the anode and the cathode.

BACKGROUND ART

Typically, a solid oxide fuel cell (SOFC) employs an electrolyte of ion-conductive oxide such as stabilized zirconia. The electrolyte is interposed between an anode and a cathode to form an electrolyte electrode assembly (MEA). The electrolyte electrode assembly is interposed between separators (bipolar plates). In use, predetermined numbers of the electrolyte electrode assemblies and the separators are stacked together to form a fuel cell stack.

For example, in a flat plate type solid oxide fuel cell disclosed in Japanese Laid-Open Patent Publication No. 10-172594, a separator $1a$ as shown in FIG. 17 is provided, and a plurality of unit cells (not shown) and separators $1a$ are stacked alternately. Gas supply holes $2aa$, $3aa$, and gas discharge holes $2ab$, $3ab$ extend through four corners of the separator $1a$ in the stacking direction, and a plurality of gas flow grooves $4aa$ and ridges $4ab$ in a plurality of rows are arranged alternately along the surface of the separator $1a$.

The gas flow grooves $4aa$ are connected to the gas supply hole $2aa$ and the gas discharge hole $2ab$ through triangular recesses $5aa$, $5ab$. A throttle section $6a$ and blocks $7a$ are provided in a gas inlet section of the triangular recess $5aa$, near the gas supply hole $2aa$, as means for limiting the flow rate of the gas. The throttle section $6a$ and the blocks $7a$ function to increase the pressure loss of the gas flowing from the gas supply hole $2aa$ to the gas inlet section for equal distribution of the gas.

Further, at opposite ends of the gas flow grooves $4aa$, a shallow gas flow inlet section $8aa$ and a shallow gas flow outlet section $8ab$ are provided to cause a pressure loss in the gas flow.

Further, in a solid oxide fuel cell disclosed in Japanese Laid-Open Patent Publication No. 2005-085520, as shown in FIG. 18, the fuel cell is formed by stacking power generation cells $1b$, fuel electrode current collectors $2b$, air electrode current collectors $3b$, and separators $4b$. The power generation cell $1b$ includes a fuel electrode layer, and an air electrode layer, and a solid electrolyte layer interposed between the fuel electrode layer and the air electrode layer. The fuel electrode current collector $2b$ is provided outside the fuel electrode layer, and the air electrode current collector $3b$ is provided outside the air electrode layer. The separators $4b$ are provided outside the current collectors $2b$, $3b$. Though not shown, a ring shaped metal cover covers the outer circumferential portion of a circular porous metal body making up the current collector $2b$, and a large number of gas outlets are provided over the entire circumferential side portion of the cover at predetermined intervals.

In the structure, the fuel gas diffused in the porous metal body is prevented from being emitted from the entire outer circumferential portion of the porous metal body. According to the disclosure, the amount of the fuel gas which is not used in the power generation and discharged from the outer circumferential portion is suppressed, and the fuel gas is thus supplied to the power generation cell $1b$ efficiently.

Further, in a flat stack fuel cell disclosed in Japanese Laid-Open Patent Publication No. 2006-120589, as shown in FIG. 19, a separator $1c$ stacked on a power generation cell is provided. The separator $1c$ is formed by connecting left and right manifold parts $2c$ and a part $3c$ disposed at the center where the power generation cell is provided, by joint parts $4c$. The joint parts $4c$ have elasticity.

The manifold parts $2c$ have gas holes $5c$, $6c$. One gas hole $5c$ is connected to a fuel gas channel $7c$, and the other gas hole $6c$ is connected to an oxygen-containing gas channel $8c$. The fuel gas channel $7c$ and the oxygen-containing gas channel $8c$ extend in a spiral pattern into the part $3c$, and are opened to a fuel electrode current collector and an air electrode current collector (not shown), respectively, at positions near the center of the part $3c$.

SUMMARY OF INVENTION

In Japanese Laid-Open Patent Publication No. 10-172594, since seals are provided, in comparison with seal-less structure, excessive loads tend to be applied to the MEAs. Therefore, for example, the MEAs may be cracked or damaged undesirably. Further, Japanese Laid-Open Patent Publication No. 10-172594 is not directed to a technique of suitably preventing the fuel gas, the oxygen-containing gas, or the exhaust gas from unnecessarily flowing around.

Further, in Japanese Laid-Open Patent Publication No. 2005-085520, the ring-shaped metal cover has a large number of gas outlets formed at predetermined intervals over the entire circumferential side portion of the metal cover, and the metal cover and the separator are provided as separate components. Therefore, a larger number of components are required, the structure is complicated, and the cost is high. Further, a larger number of assembling steps are required, and thus, the operating efficiency is low. Further, the dimension in the thickness direction is large, and the length of the entire stack in the stacking direction is large.

Further, in Japanese Laid-Open Patent Publication No. 2006-120589, the fuel gas, the oxygen-containing gas, or the exhaust gas tends to flow around to portions to which such a gas does not need to be supplied. As a result, the electrodes may be degraded undesirably, and power generation performance may be lowered undesirably.

The present invention solves the above problems, and an object of the present invention is to provide a fuel cell having simple and economical structure, in which it is possible to prevent gases from unnecessarily flowing around to some portions, improve durability, and prevent excessive heat.

The present invention relates to a fuel cell formed by stacking electrolyte electrode assemblies and separators alternately in a stacking direction. Each of the electrolyte electrode assemblies includes an anode, a cathode, and an electrolyte interposed between the anode and the cathode.

Each of the separators includes a sandwiching section for sandwiching the electrolyte electrode assembly, a bridge connected to the sandwiching section, and a fuel gas supply section connected to the bridge. A fuel gas channel for supplying a fuel gas along an electrode surface of the anode of one electrolyte electrode assembly and an oxygen-containing gas channel for supplying an oxygen-containing gas along an electrode surface of the cathode of the other electrolyte electrode assembly are individually formed in the sandwiching section. A fuel gas supply channel for supplying the fuel gas to the fuel gas channel is formed in the bridge. A fuel gas supply passage extends through the fuel gas supply section in the stacking direction for supplying the fuel gas to the fuel gas supply channel.

The sandwiching section includes a fuel gas inlet for supplying the fuel gas to the fuel gas channel, an outer circumferential protrusion protruding toward the fuel gas channel, and contacting an outer circumference of the anode, and at least one fuel gas outlet channel provided on a side opposite to a portion connecting the sandwiching section and the bridge for discharging the fuel gas partially consumed in the fuel gas channel (hereinafter referred to as the exhaust fuel gas). In the fuel gas outlet channel, the cross sectional area on the downstream side in the gas flow direction of the fuel gas is larger than the cross sectional area on the upstream side in the gas flow direction of the fuel gas.

In the present invention, the separator includes the sandwiching sections for sandwiching the electrolyte electrode assemblies, the bridges connected to the sandwiching sections, and the fuel gas supply section connected to the bridges. In the structure, the tightening load in the stacking direction is not transmitted between the fuel gas supply section and the electrolyte electrode assembly through the bridge. Thus, with simple and compact structure, a relatively large load is applied to the portion requiring high sealing performance, and a relatively small load is applied to the electrolyte electrode assembly. Accordingly, damage of the electrolyte electrode assembly is prevented, and power generation and collection of electrical energy are performed efficiently.

Further, the fuel gas supplied from the fuel gas inlet to the fuel gas channel is prevented from blowing to the outside by the outer circumferential protrusion protruding toward the fuel gas channel to contact the outer circumference of the anode. Therefore, the fuel gas can be utilized effectively by the power generation reaction, and the fuel utilization ratio is improved suitably.

Further, gases other than the fuel gas, such as the oxygen-containing gas and the exhaust gas do not flow around to the anode from the outside of the electrolyte electrode assembly. Therefore, degradation in the power generation efficiency due to oxidation of the anode is prevented, and improvement in the durability of the separator and the electrolyte electrode assembly is achieved easily.

Further, after the fuel gas supplied from the fuel gas inlet to the fuel gas channel is partially consumed in the reaction, the partially consumed fuel gas is discharged through at least one fuel gas outlet channel provided on a side opposite to the portion connecting the sandwiching section and the bridge. Therefore, since the exhaust fuel gas is discharged outside of the separator and the electrolyte electrode, it is possible to prevent excessive heat.

Further, the fuel gas supplied from the fuel gas inlet to the fuel gas channel is discharged through the fuel gas outlet channel. The cross sectional area of the fuel gas outlet channel is large on the downstream side. In the structure, blowing of the fuel gas to the outside is prevented. Therefore, the fuel gas can be utilized effectively in the power generation reaction, and the fuel utilization ratio is improved suitably.

Further, gases other than the fuel gas, such as the oxygen-containing gas and the exhaust gas do not flow around to the anode from the outside of the electrolyte electrode assembly. Therefore, degradation in the power generation efficiency due to oxidation of the anode is prevented, and improvement in the durability of the separator and the electrolyte electrode assembly is achieved easily.

DESCRIPTION OF EMBODIMENTS

Figure 1:
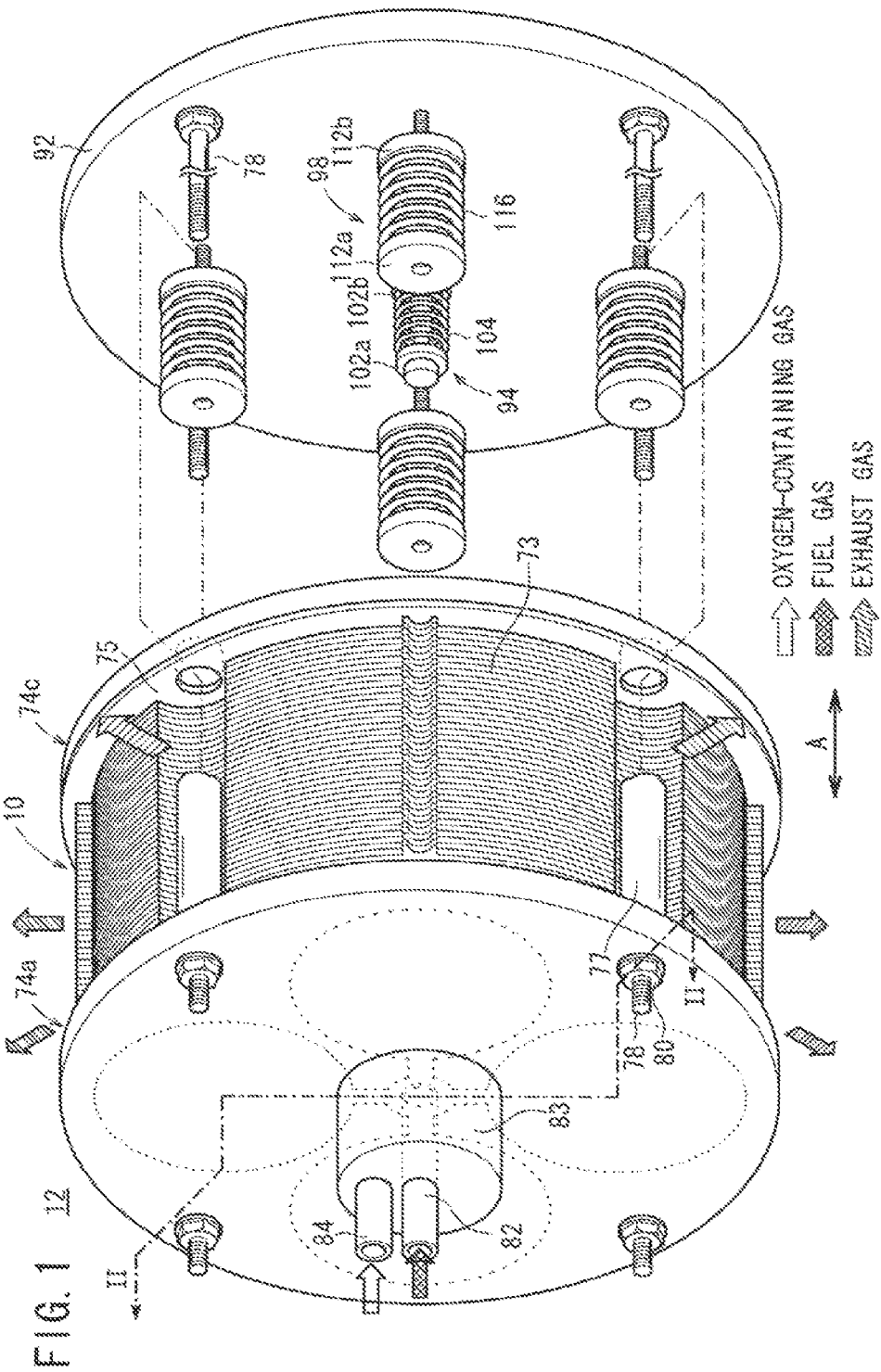
FIG. 1 is a perspective view schematically showing a fuel cell stack formed by stacking a plurality of fuel cells according to a first embodiment of the present invention.
Figure 2:
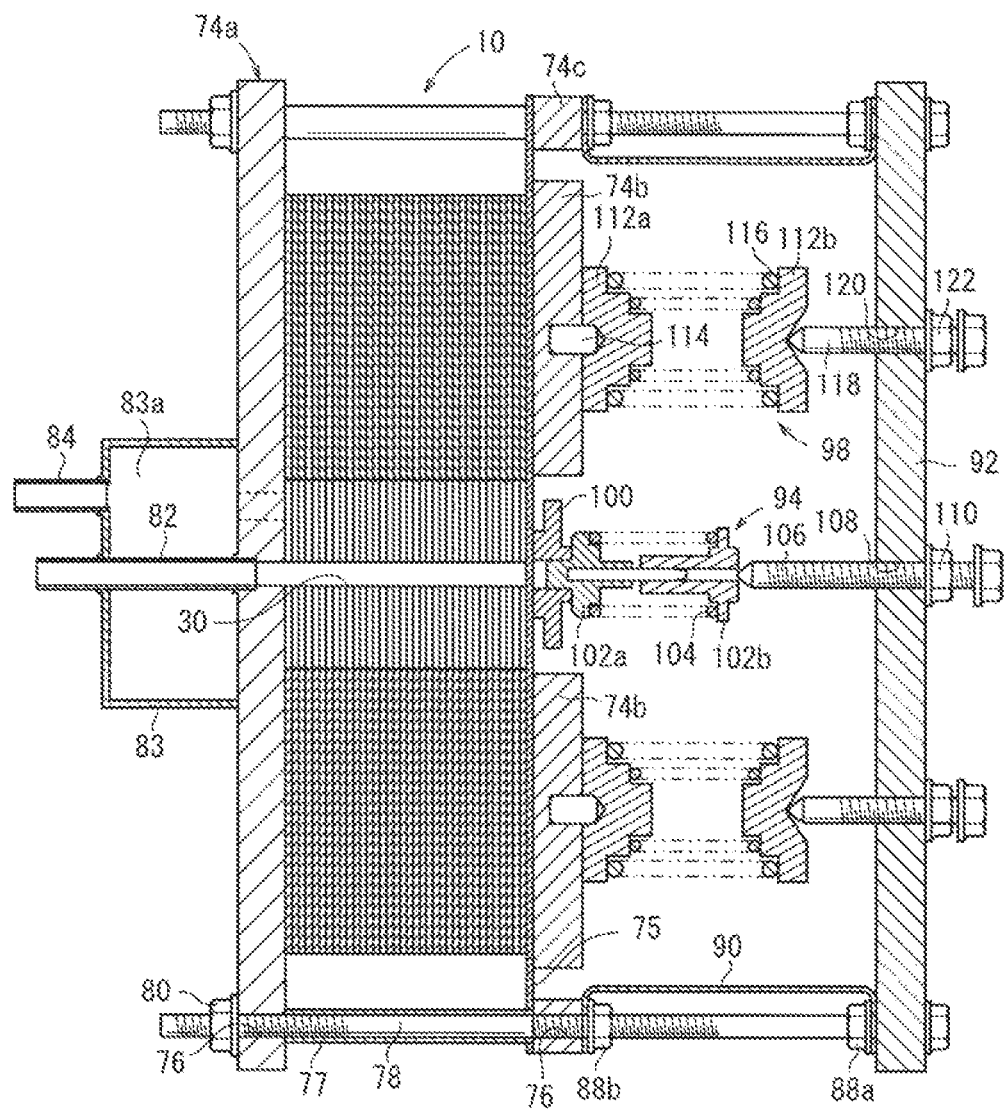
FIG. 2 is a cross sectional view showing the fuel cell stack, taken along a line II-II shown in FIG. 1.

As shown in FIGS. 1 and 2, a fuel cell according to a first embodiment of the present invention is formed by stacking a plurality of fuel cells 10 in a direction indicated by an arrow A. The fuel cell 10 is a solid oxide fuel cell (SOFC) used in various applications, including stationary and mobile applications. For example, the fuel cell 10 is mounted on a vehicle.

Figure 3:
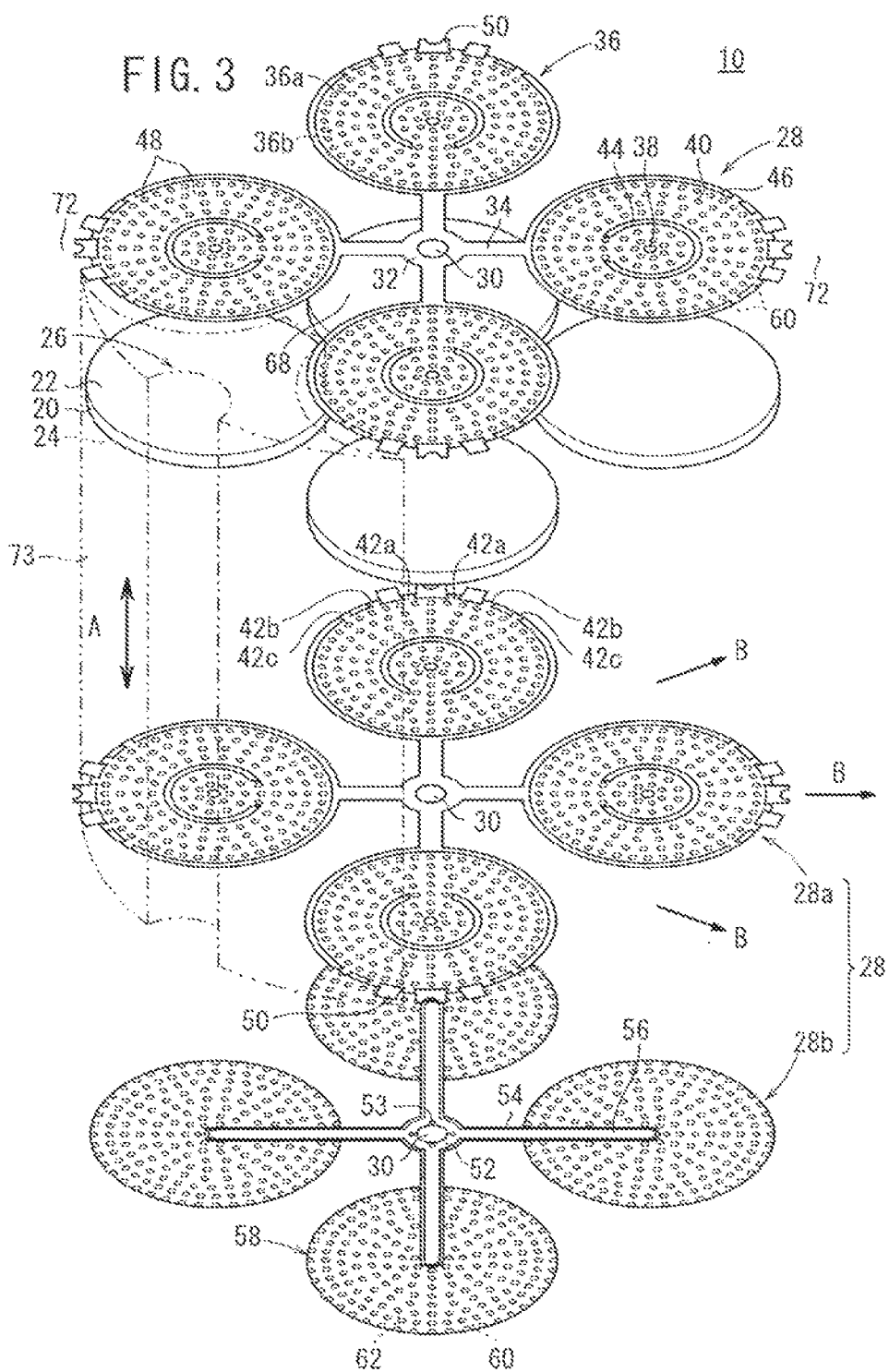
FIG. 3 is an exploded perspective view showing the fuel cell.
Figure 4:
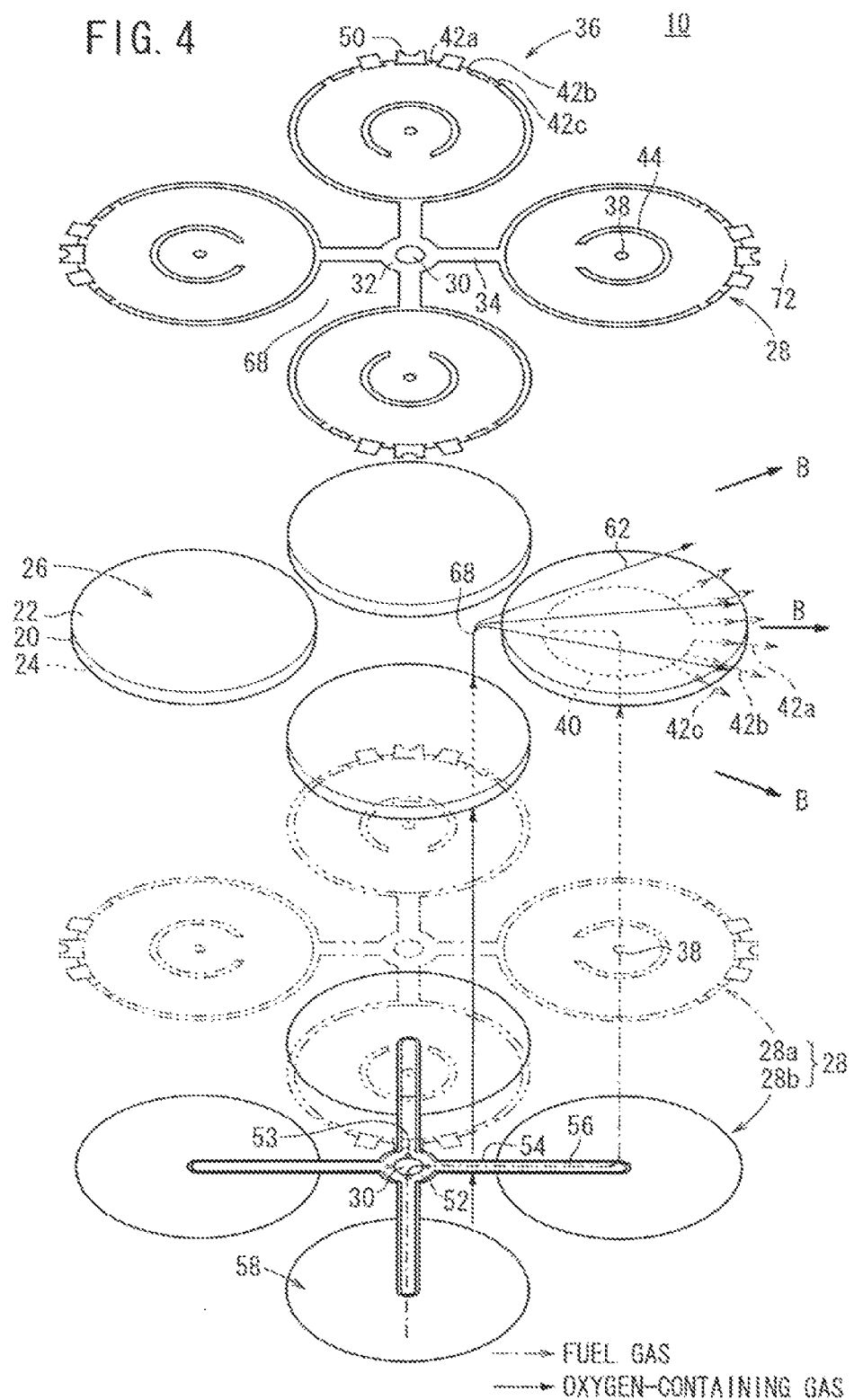
FIG. 4 is a partially exploded perspective view showing gas flows in the fuel cell.

As shown in FIGS. 3 and 4, the fuel cell 10 includes electrolyte electrode assemblies (MEAs) 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive oxide such as stabilized zirconia. The electrolyte electrode assembly 26 has a circular disk shape. A barrier layer (not shown) is provided at least at the outer circumferential edge of the electrolyte electrode assembly 26 for preventing entry or discharge of the oxygen-containing gas and the fuel gas.

The fuel cell 10 is formed by sandwiching a plurality of (e.g., four) electrolyte electrode assemblies 26 between a pair of separators 28. The four electrolyte electrode assemblies 26 are provided on a circle around a fuel gas supply passage 30 extending through the center of the separators 28.

As shown in FIG. 3, each of the separators 28 is formed by joining a first plate 28a and a second plate 28b made of, for example, a metal plate of stainless alloy, etc., or a carbon plate. A first fuel gas supply section 32 is formed in the first plate 28a, and the fuel gas supply passage 30 centrally extends through the first fuel gas supply section 32. Four first bridges 34 extend radially outwardly from the first fuel gas supply section 32 at equal angular intervals, e.g., 90°. The first fuel gas supply section 32 is integral with first sandwiching sections 36 each having a relatively large diameter through the first bridges 34. The centers of the first sandwiching sections 36 are equally distanced from the center of the first fuel gas supply section 32.

Each of the first sandwiching sections 36 has a circular disk shape, having substantially the same dimensions as the electrolyte electrode assembly 26. The first sandwiching sections 36 are separated from each other. A fuel gas inlet 38 for supplying the fuel gas is formed at the center of the first sandwiching section 36, or at a position deviated upstream from the center of the first sandwiching section 36 in the flow direction of the oxygen-containing gas.

Each of the first sandwiching sections 36 has a fuel gas channel 40 on a surface 36a which contacts the anode 24, for supplying a fuel gas along an electrode surface of the anode 24. Further, a pair of fuel gas outlet channels 42a, a pair of fuel gas outlet channels 42b, and a pair of fuel gas outlet channels 42c for discharging the fuel gas partially consumed in the fuel gas channel 40 and a circular arc wall (detour channel forming wall) 44 contacting the anode 24 and forming a detour path to prevent the fuel gas from flowing straight from the fuel gas inlet 38 to the fuel gas outlet channels 42a, 42b, 42c are provided on the surface 36a of the first sandwiching section 36.

Figure 5:
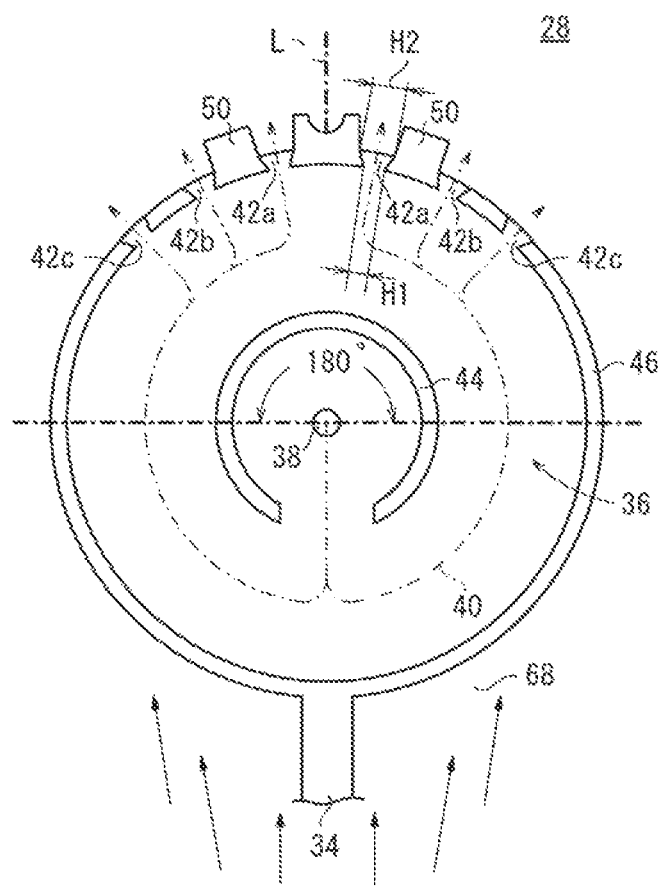
FIG. 5 is a partial view showing a separator of the fuel cell.

As shown in FIG. 5, the fuel gas outlet channels 42a, 42b, 42c are provided on a side opposite to a portion connecting the first sandwiching section 36 and the first bridge 34, on both sides of an extended line L of the first bridge 34 at equal intervals. In the fuel gas outlet channels 42a, 42b, 42c, the cross sectional area on the downstream side in the gas flow direction of the fuel gas along the fuel gas channel 40 is larger than the cross sectional area on the upstream side in the gas flow direction of the fuel gas.

Specifically, an outer circumferential protrusion 46 and a plurality of projections 48 are provided on the surface 36a of each first sandwiching section 36. The outer circumferential protrusion 46 protrudes toward the fuel gas channel 40 to contact the outer circumferential portion of the anode 24, and the projections 48 contact the anode 24. The fuel gas outlet channels 42a, 42b, 42c are formed at the outer circumferential protrusion 46 by directly cutting out portions of the outer circumferential protrusion 46.

In the fuel gas outlet channels 42a, 42b, 42c, the width H2 on the outer side of the outer circumferential protrusion 46 is larger than the width H1 on the inner side of the outer circumferential protrusion 46 (H1<H2). The depth of the fuel gas outlet channels 42a, 42b, 42c is the same over the entire surfaces of the fuel gas outlet channels 42a, 42b, 42c. Thus, the cross sectional area on the downstream side in the gas flow direction is larger than the cross sectional area on the upstream side in the gas flow direction.

As shown in FIG. 3, the circular arc wall 44 has a substantially horseshoe shape (circular arc shape with partial cutout). The fuel gas inlet 38 is provided inside the circular arc wall 44. The projections 48 are made of, e.g., solid portions formed by etching or hollow portions formed by press forming.

The first sandwiching section 36 has a pair of extensions 50 for collecting electricity generated in the power generation of the electrolyte electrode assembly 26, and for measuring the state of the electrolyte electrode assembly 26. The extensions 50 protrude from the outer circumferential portion of the first sandwiching section 36 or from between the fuel gas outlet channels 42a, 42b.

Figure 6:
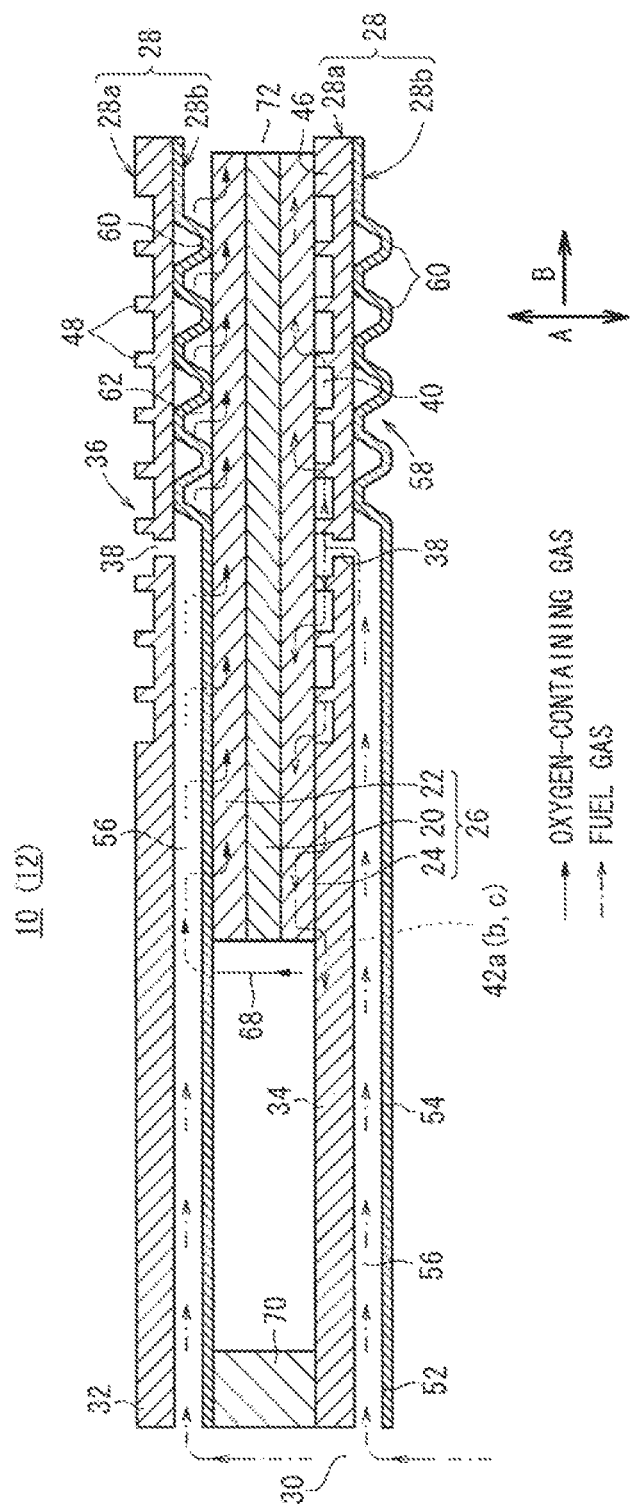
FIG. 6 is a cross sectional view schematically showing operation of the fuel cell.

As shown in FIGS. 3 and 6, each of the first sandwiching sections 36 has a substantially planar surface 36b which contacts the cathode 22. A second plate 28b is fixed to the surface 36b, e.g., by brazing, diffusion bonding, laser welding, or the like.

As shown in FIG. 3, a second fuel gas supply section 52 is formed in the second plate 28b, and the fuel gas supply passage 30 extends through the center of the second fuel gas supply section 52. A predetermined number of reinforcement bosses 53 are formed on the second fuel gas supply section 52. Four second bridges 54 extend radially from the second fuel gas supply section 52. Each of the second bridges 54 has a fuel gas supply channel 56 connecting the fuel gas supply passage 30 of the second fuel gas supply section 52 to the fuel gas inlet 38. The fuel gas supply channel 56 is formed, for example, by etching or by press forming.

Each of the second bridges 54 is integral with a second sandwiching section 58 having a relatively large diameter. A plurality of projections 60 are provided on the second sandwiching section 58, e.g., by etching or press forming. The projections 60 form an oxygen-containing gas channel 62 for supplying an oxygen-containing gas along an electrode surface of the cathode 22 on the surface 36b of the first sandwiching section 36. The projections 60 function as a current collector (see FIGS. 3 and 6).

As shown in FIG. 6, an oxygen-containing gas supply passage 68 is connected to the oxygen-containing gas channel 62 for supplying the oxygen-containing gas from a space between an inner circumferential edge of the electrolyte electrode assembly 26 and an inner circumferential edge of the first and second sandwiching sections 36, 58 in a direction indicated by an arrow B. The oxygen-containing gas supply passage 68 extends inside the first and second sandwiching sections 36, 58 in the stacking direction indicated by the arrow A, between the respective first and second bridges 34, 54 to form an oxygen-containing gas supply section.

An insulating seal 70 for sealing the fuel gas supply passage 30 is provided between the separators 28. For example, mica material, ceramic material or the like, i.e., crustal component material, glass material, or composite material of clay and plastic may be used for the insulating seal 70. The insulating seal 70 seals the fuel gas supply passage 30 from the electrolyte electrode assemblies 26.

In the fuel cell 10, exhaust gas discharge passages 72 are provided around the first and second sandwiching sections 36, 58. The exhaust gas discharge passages 72 form an exhaust gas discharge section for discharging the fuel gas and the exhaust gas partially consumed in the electrolyte electrode assemblies 26 as an exhaust gas in the stacking direction. As necessary, an air regulating plate 73 is provided in each space between the first and second sandwiching sections 36, 58 (see FIG. 3).

As shown in FIGS. 1 and 2, a fuel cell stack 12 includes a first end plate 74a having a substantially circular disk shape at one end in the stacking direction of the fuel cells 10. Further, the fuel cell stack 12 includes a plurality of second end plates 74b and a fixing ring 74c at the other end in the stacking direction of the fuel cells 10, through a partition wall 75. Each of the second end plates 74b has a small diameter and a substantially circular shape, and the fixing ring 74c has a large diameter and a substantially ring shape. The partition wall 75 prevents diffusion of the exhaust gas to the outside of the fuel cells 10. The number of the second end plates 74b is four, corresponding to the positions of the stacked electrolyte electrode assemblies 26.

The first end plate 74a and the fixing ring 74c include a plurality of holes 76. Bolts 78 are inserted into the holes 76 and bolt insertion collar members 77, and screwed into nuts 80. By the bolts 78 and the nuts 80 through which the bolts 78 are screwed, the first end plate 74a and the fixing ring 74c are fixedly tightened together.

One fuel gas supply pipe 82, a casing 83, and one oxygen-containing gas supply pipe 84 are provided at the first end plate 74a. The fuel gas supply pipe 82 is connected to the fuel gas supply passage 30. The casing 83 has a cavity 83a connected to the respective oxygen-containing gas supply passages 68. The oxygen-containing gas supply pipe 84 is connected to the casing 83, and to the cavity 83a.

A support plate 92 is fixed to the first end plate 74a through a plurality of bolts 78, nuts 88a, 88b, and plate collar members 90. A first load applying unit 94 for applying a tightening load to the first and second fuel gas supply sections 32, 52 and second load applying units 98 for applying a tightening load to each of the electrolyte electrode assemblies 26 are provided between the support plate 92 and the first end plate 74a. The first load applying unit 94 and the second load applying units 98 form a load applying mechanism.

The first load applying unit 94 includes a presser member 100 provided at the center of the fuel cells 10 (centers of the first and second fuel gas supply sections 32, 52) for preventing leakage of the fuel gas from the fuel gas supply passage 30. The presser member 100 is provided near the center of the four second end plates 74b for pressing the fuel cells 10 through the partition wall 75. A first spring 104 is provided at the presser member 100 through a first receiver member 102a and a second receiver member 102b. A front end of a first presser bolt 106 contacts the second receiver member 102b. The first presser bolt 106 is screwed into a first screw hole 108 formed in the support plate 92. The position of the first presser bolt 106 is adjustable through a first nut 110.

Each of the second load applying units 98 includes a third receiver member 112a at the second end plate 74b, corresponding to each of the electrolyte electrode assemblies 26. The third receiver member 112a is positioned on the second end plate 74b through a pin 114. One end of a second spring 116 contacts the third receiver member 112a and the other end of the second spring 116 contacts a fourth receiver member 112b. A front end of a second presser bolt 118 contacts the fourth receiver member 112b. The second presser bolt 118 is screwed into a second screw hole 120 formed in the support plate 92. The position of the second presser bolt 118 is adjustable through a second nut 122.

Operation of the fuel cell stack 12 will be described below.

As shown in FIG. 1, the fuel gas is supplied through the fuel gas supply pipe 82 connected to the first end plate 74a. Then, the fuel gas flows into the fuel gas supply passage 30. The air as the oxygen-containing gas is supplied from the oxygen-containing gas supply pipe 84 to each of the oxygen-containing gas supply passages 68 through the cavity 83a.

As shown in FIG. 6, the fuel gas flows along the fuel gas supply passage 30 of the fuel cell stack 12 in the stacking direction indicated by the arrow A. The fuel gas moves through the fuel gas supply channel 56 of each fuel cell 10 along the surface of the separator 28.

The fuel gas flows from the fuel gas supply channel 56 into the fuel gas channel 40 through the fuel gas inlet 38 formed in the first sandwiching section 36. The fuel gas inlet 38 is provided at substantially the central position of the anode 24 of each electrolyte electrode assembly 26. Thus, the fuel gas is supplied from the fuel gas inlet 38 to substantially the center of the anode 24, and flows along the fuel gas channel 40 from substantially the central region to the outer circumferential region of the anode 24.

The air (oxygen-containing gas), which has been supplied to the oxygen-containing gas supply passages 68, flows from the space between the inner circumferential edge of the electrolyte electrode assembly 26 and the inner circumferential edges of the first and second sandwiching sections 36, 58 into the oxygen-containing gas channel 62 in the direction indicated by the arrow B. In the oxygen-containing gas channel 62, the air flows from the inner circumferential edge (center of the separator 28) of the cathode 22 to the outer circumferential edge (outer circumferential edge of the separator 28) of the cathode 22, i.e., from one end to the other end of the cathode 22 of the electrolyte electrode assembly 26.

Thus, in each of the electrolyte electrode assemblies 26, the fuel gas flows from the center to the outer circumferential side on the electrode surface of the anode 24, and the air flows in one direction indicated by the arrow B on the electrode surface of the cathode 22. At this time, oxide ions flow through the electrolyte 20 toward the anode 24 for generating electricity by electrochemical reactions.

The exhaust gas chiefly containing the air after partial consumption in the power generation reaction is discharged from the outer circumferential region of each of the electrolyte electrode assemblies 26, and flows through the exhaust gas discharge passage 72 as the off gas, and the off gas is discharged from the fuel cell stack 12 (see FIG. 1).

In the first embodiment, the separator 28 includes the first and second sandwiching sections 36, 58 for sandwiching the electrolyte electrode assemblies 26, the first and second bridges 34, 54 connected to the first and second sandwiching sections 36, 58, and the first and second fuel gas supply sections 32, 52 connected to the first and second bridges 34, 54.

Thus, the tightening load in the stacking direction is not transmitted between the first and second fuel gas supply sections 32, 52 and the electrolyte electrode assemblies 26. With simple and compact structure, a relatively large load is applied to the portion requiring high sealing performance, and a relatively small load is applied to the electrolyte electrode assemblies 26. Thus, damages of the electrolyte electrode assemblies 26 are prevented, and power generation and collection of electrical energy are performed efficiently.

The outer circumferential protrusion 46 which contacts the outer circumferential portion of the anode 24 is provided on the surface 36a of the first sandwiching section 36. Therefore, after the fuel gas is supplied from the fuel gas inlet 38 to the fuel gas channel 40, blowing of the fuel gas to the outside is prevented. Therefore, the fuel gas can be utilized effectively by the power generation reaction, and the fuel utilization ratio is improved suitably.

Further, gases other than the fuel gas, such as the oxygen-containing gas and the exhaust gas do not flow around to the anode 24 from the outside of the electrolyte electrode assembly 26. Therefore, degradation in the power generation efficiency due to oxidation of the anode 24 is prevented, and improvement in the durability of the separator 28 and the electrolyte electrode assembly 26 is achieved easily.

Further, in the surface 36a of the first sandwiching section 36, the fuel gas outlet channels 42a, 42b, 42c are provided on the side opposite to the portion connecting the first sandwiching section 36 and the first bridge 34, on both sides of the extended line L of the first bridge 34. Therefore, the fuel gas is supplied from the fuel gas inlet 38 to the fuel gas channel 40, and the fuel gas is partially consumed in the reaction. Then, the fuel gas is distributed into the fuel gas outlet channels 42*a*, 42*b*, 42*c*, and discharged separately.

Therefore, in the cathode surface of the separator 28, the water vapor and the unconsumed fuel gas are not concentrated in a certain region (outwardly and a side opposite to the portion connecting the first sandwiching section and the first bridge), and thus, an ununiform temperature distribution due to overheating is prevented suitably. Accordingly, it becomes possible to achieve a uniform temperature distribution in the fuel cell 10, and the durability of the fuel cell 10 is improved advantageously.

Further, the exhaust fuel gas is discharged outside of the separator 28 and the electrolyte electrode assembly 26. Thus, the generation of excessive heat can be prevented.

Further, in the fuel gas outlet channels 42*a*, 42*b*, 42*c*, the width H2 on the outer side of the outer circumferential protrusion 46 is larger than the width H1 on the inner side of the outer circumferential protrusion 46 (H1<H2). Thus, in the fuel gas outlet channels 42*a*, 42*b*, 42*c*, the cross sectional area on the downstream side in the gas flow direction is larger than the cross sectional area on the upstream side in the gas flow direction. In the structure, blowing of the fuel gas to the outside is prevented. Thus, the fuel gas is utilized effectively in the power generation reaction, and improvement in the fuel utilization ratio is achieved advantageously.

Further, gases other than the fuel gas, such as the oxygen-containing gas and the exhaust gas do not flow around to the anode 24 from the outside of the electrolyte electrode assembly 26. Therefore, degradation in the power generation efficiency due to oxidation of the anode 24 is prevented, and improvement in the durability of the separator 28 and the electrolyte electrode assembly 26 is achieved easily.

Further, in the first embodiment, as shown in FIG. 3, the circular arc wall 44 is provided in the path connecting the fuel gas inlet 38 and the fuel gas outlet channels 42*a* to 42*c* on the surface 36*a* of the first sandwiching section 36 of the separator 28. The circular arc wall 44 contacts the anode 24 of the electrolyte electrode assembly 26, and thus, improvement in the electricity collecting efficiency is obtained.

In the structure, the fuel gas supplied from the fuel gas inlet 38 to the fuel gas channel 40 is blocked by the circular arc wall 44. Thus, the fuel gas does not flow straight from the fuel gas inlet 38 to the fuel gas outlet channels 42*a* to 42*c*. The fuel gas flows around in the fuel gas channel 40, and the fuel gas flows along the anode 24 over a longer distance. That is, the fuel gas flows along the anode 24 over a longer period of time, and the fuel gas can be consumed effectively in the power generation reaction. Accordingly, the fuel gas utilization ratio is improved effectively.

Further, the fuel gas outlet channels 42*a* to 42*c* are formed by slits or the like formed in the outer circumferential protrusion 46. Therefore, the structure is simplified comparatively. Further, reduction in the production cost and reduction in the number of components are achieved.

Further, the first and second fuel gas supply sections 32, 52 are provided at the central part of the separator 28, and the plurality of, e.g., four electrolyte electrode assemblies 26 are arranged on a circle around the first and second fuel gas supply sections 32, 52. In the structure, even if the fuel gas supplied to the fuel cells 10 (fuel cell stack 12) is overheated by heat produced in power generation, it is possible to enhance the prevention of excessive heat in the fuel cells 10 (fuel cell stack 12).

Further, the fuel gas can be distributed uniformly to each of the electrolyte electrode assemblies 26 from the first and second fuel gas supply sections 32, 52. Thus, improvement and stability in the power generation performance are achieved in each of the electrolyte electrode assemblies 26.

Further, the first and second sandwiching sections 36, 58 have a shape corresponding to the electrolyte electrode assemblies 26, and the first and second sandwiching sections 36, 58 are separated from each other. Since the first and second sandwiching sections 36, 58 have a shape, e.g., circular disk shape corresponding to the electrolyte electrode assemblies 26, it becomes possible to efficiently collect electrical energy generated in the electrolyte electrode assemblies 26.

Further, since the first and second sandwiching sections 36, 58 are separated from each other, it becomes possible to absorb variation of the load applied to the respective electrolyte electrode assemblies 26 due to dimensional differences in the electrolyte electrode assemblies 26 and the separators 28. Thus, the undesired distortion does not occur in the entire separators 28. It is possible to apply the load equally to each of the electrolyte electrode assemblies 26.

Further, thermal distortion or the like of the electrolyte electrode assemblies 26 is not transmitted to the adjacent, other electrolyte electrode assemblies 26, and no dedicated dimensional variation absorbing mechanisms are required between the electrolyte electrode assemblies 26. Thus, the electrolyte electrode assemblies 26 can be provided close to each other, and the overall size of the fuel cell 10 can be reduced easily.

Further, the first and second bridges 34, 54 extend radially outwardly from the first and second fuel gas supply sections 32, 52 such that the first and second bridges 34, 54 are spaced at equal angular intervals. In the structure, the fuel gas can be supplied from the first and second fuel gas supply sections 32, 52 equally to the respective electrolyte electrode assemblies 26 through the first and second bridges 34, 54. Thus, improvement and stability in the power generation performance can be achieved in each of the electrolyte electrode assemblies 26.

Further, in the separator 28, the number of the first and second sandwiching sections 36, 58 and the number of the first and second bridges 34, 54 correspond to the number of the electrolyte electrode assemblies 26. Therefore, the fuel gas is uniformly supplied from the first and second fuel gas supply sections 32, 52 to each of the electrolyte electrode assemblies 26 through the first and second bridges 34, 54 and the first and second sandwiching sections 36, 58. Thus, improvement and stability in the power generation performance can be achieved in each of the electrolyte electrode assemblies 26.

Further, the projections 48 provided on the first sandwiching section 36 protrude toward the fuel gas channel 40, and contact the anode 24. In the structure, electrical energy is collected suitably through the projections 48.

Further, the projections 60 provided on the second sandwiching section 58 protrude toward the oxygen-containing gas channel 62, and contact the cathode 22. In the structure, electrical energy is collected suitably through the projections 60.

Further, the first sandwiching section 36 has the extensions 50. In the structure, for example, electrical energy generated in the power generation of the electrolyte electrode assembly 26 can be collected, and a state such as the temperature of the electrolyte electrode assembly 26 can be measured easily, through the extensions 50.

Further, the extensions 50 are provided at the outer circumference of the first sandwiching section 36, between the fuel gas outlet channels 42a, 42b. In the structure, the extensions 50 are displaced from positions directly exposed to the exhaust fuel gas. Thus, overheating by the hot exhaust fuel gas is suppressed. The temperature measurement or the like of the separator 28 or the electrolyte electrode assembly 26 is performed highly accurately.

Further, since the fuel cell 10 has the exhaust gas discharge section where the exhaust gas discharge passage 72 extends in the stacking direction and the oxygen-containing gas supply section having the oxygen-containing gas supply passage 68 for supplying the oxygen-containing gas before supplied to the electrolyte electrode assembly 26, the overall size of the fuel cell 10 is reduced easily.

Moreover, the first and second fuel gas supply sections 32, 52 are provided at the center of the separator 28, and the plurality of, e.g., four oxygen-containing gas supply passages 68 are arranged on a circle around the first and second fuel gas supply sections 32, 52. Further, the oxygen-containing gas supply passages 68 are arranged between the plurality of, e.g., four first and second bridges 34, 54. In the structure, even if the fuel gas and the oxygen-containing gas supplied to the fuel cells 10 (fuel cell stack 12) are overheated by heat produced in power generation, it is possible to enhance the prevention of excessive heat in the fuel cell 10 (and the fuel cell stack 12).

The fuel gas supplied to and partially consumed in the electrolyte electrode assembly 26 is discharged through the fuel gas outlet channels 42a, 42b, 42c to the exhaust gas discharge passages 72. In the structure, even if the exhaust gas is overheated by reaction with unconsumed fuel gas and unconsumed oxygen-containing gas remaining in the exhaust fuel gas, it is possible to enhance the prevention of excessive heat.

Further, the oxygen-containing gas supplied to and partially consumed in the electrolyte electrode assemblies 26 is discharged as an exhaust oxygen-containing gas through the oxygen-containing gas channel 62 to the exhaust gas discharge passages 72. Thus, even if exhaust gas is overheated by reaction with unconsumed fuel gas and unconsumed oxygen-containing gas remaining in the exhaust gas, it is possible to prevent generation of excessive heat.

Further, the fuel cell 10 is a solid oxide fuel cell. With simple structure, the oxygen-containing gas and the exhaust gas can be prevented from flowing around to the anode 24. Further, the exhaust gas is distributed to achieve a uniform temperature distribution. Thus, it is possible to improve durability of the fuel cell 10 (fuel cell stack 12) and prevent excessive heat.

In the first embodiment, the three fuel gas outlet channels 42a, 42b, 42c are provided on each of both sides of the first bridge 34, on a side opposite to the portion connecting the first sandwiching section 36 and the first bridge 34. However, the present invention is not limited in this respect. For example, two or more fuel gas outlet channels may be provided on each of both sides of the first bridge 34. Preferably, the area where the fuel gas outlet channels are formed is within a range of 180° of each of the first sandwiching sections 36 on the inner circumferential side of the separator (see FIG. 5). In this respect, preferably, the range of the fuel gas outlet channels is limited by the air regulating plate 73.

Further, the separator 28 is made of the first plate 28a and the second plate 28b. For example, the second plate 28b may be formed of two pieces, i.e., a circular plate and a cross-shaped plate.

Figure 7:
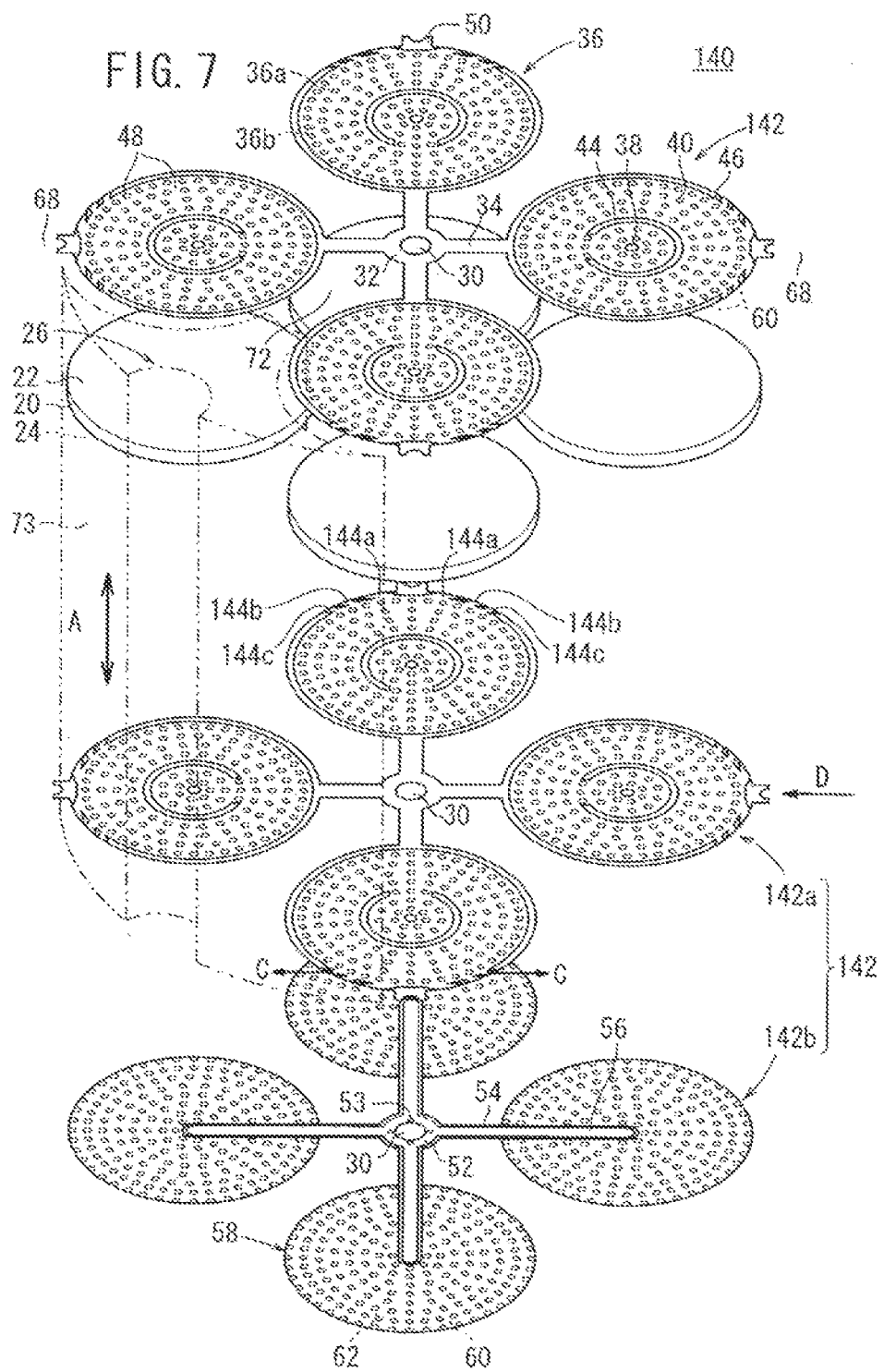
FIG. 7 is an exploded perspective view showing a fuel cell according to a second embodiment of the present invention.

FIG. 7 is an exploded perspective view showing a fuel cell 140 according to a second embodiment of the present invention. The constituent elements that are identical to those of the fuel cell 10 according to the first embodiment are labeled with the same reference numerals, and descriptions thereof will be omitted. Also in third and other embodiments as described later, the constituent elements that are identical to those of the fuel cell 10 according to the first embodiment are labeled with the same reference numerals, and descriptions thereof will be omitted.

In the fuel cell 140, oxygen-containing gas supply passages 68 are positioned outside around the first and second sandwiching sections 36, 58. A plurality of exhaust gas discharge passages 72 are arranged on a circle around the first and second fuel gas supply sections 32, 52. Each of the exhaust gas discharge passages 72 is provided between the first and second bridges 34, 54. That is, the oxygen-containing gas is supplied in directions indicated by arrows D (in directions opposite to the directions indicated by the arrows B) from the outside of the first and second sandwiching sections 36, 58, and the oxygen-containing gas is discharged to the exhaust gas discharge passages 72 on the center side of the separator, inside the first and second sandwiching sections 36, 58.

The fuel cell 140 includes separators 142, and the separator 142 is formed by joining a first plate 142a and a second plate 142b together. A pair of fuel gas outlet channels 144a, a pair of fuel gas outlet channels 144b, and a pair of fuel gas outlet channels 144c are provided on a surface 36a of each of first sandwiching sections 36 of the first plate 142a. A fuel gas partially consumed in the fuel gas channel 40 is discharged through the fuel gas outlet channels 144a, 144b, 144c.

The fuel gas outlet channels 144a, 144b, 144c are provided on a side opposite to a portion connecting the first sandwiching section 36 and the first bridge 34, on both sides of an extended line L of the first bridge 34 at equal intervals. In the fuel gas outlet channels 144a, 144b, 144c, the cross sectional area on the downstream side in the gas flow direction of the fuel gas along the fuel gas channel 40 is larger than the cross sectional area on the upstream side in the gas flow direction of the fuel gas.

Figure 8:
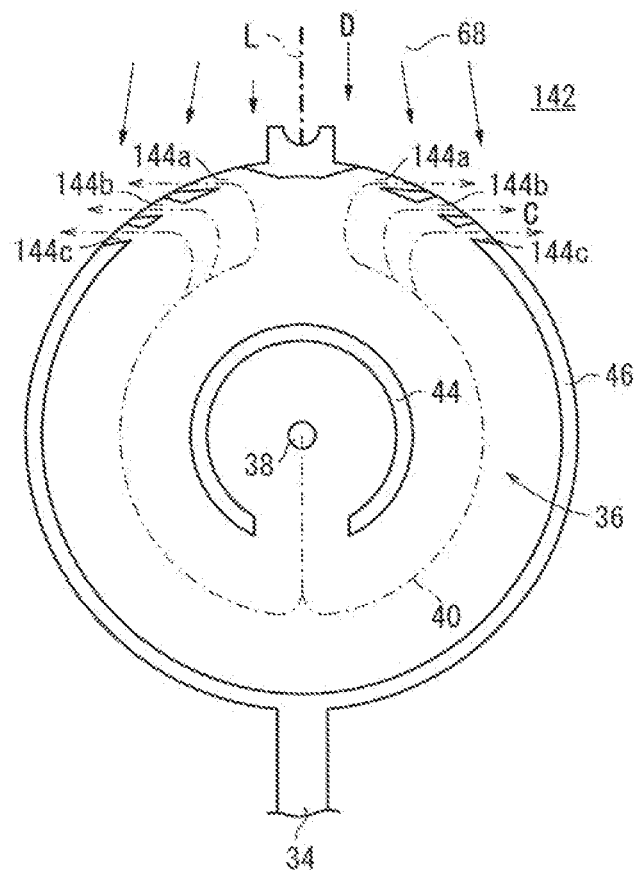
FIG. 8 is a partial view showing a separator of the fuel cell.

The gas flow directions indicated by arrows C at the fuel gas outlet channels 144a, 144b, 144c intersect straight lines connecting the first fuel gas supply section 32 and the fuel gas outlet channels 144a, 144b, 144c (see FIG. 8).

In the second embodiment, the oxygen-containing gas flows along the cathode 22 from the outside of the first and second sandwiching sections 36, 58 toward the first and second fuel gas supply sections 32, 52. In the structure, it is possible to prevent the other gases such as the oxygen-containing gas and the exhaust gas from flowing around to the anode 24 from the outside of the electrolyte electrode assembly 26. Thus, degradation of the power generation efficiency due to oxidation of the anode 24 is prevented, and improvement in the durability of the separator 142 and the electrolyte electrode assembly 26 is achieved.

In the second embodiment, the oxygen-containing gas flows in directions indicated by the arrows D, and the gas flow directions at the fuel gas outlet channels 144a, 144b, 144c are the directions indicated by the arrows C. The directions indicated by the arrows D and the directions indicated by the arrows C intersect each other. In the structure, it is possible to prevent gases other than the fuel gas, such as the oxygen-containing gas and the exhaust gas from flowing around to the anode 24 from the outside of the electrolyte electrode assembly 26. Therefore, degradation in the power generation efficiency due to oxidation of the anode 24 is prevented, and improvement in the durability of the separator 142 and the electrolyte electrode assembly 26 is achieved.

Therefore, thanks to the negative pressure effect by the flow of the oxygen-containing gas, the exhaust fuel gas is discharged smoothly from the fuel gas outlet channels 144a, 144b, 144c. In the structure, efficient operation can be performed.

Further, in the second embodiment, the exhaust gas discharge passages 72 are arranged on a circle around the first and second fuel gas supply sections 32, 52. Further, each of the exhaust gas discharge passages 72 is arranged between the first and second bridges 34, 54. In the structure, even if the fuel gas supplied to the fuel cell 140 (and the fuel cell stack) is overheated by the heat generated by the power generation and the exhaust gas, the prevention of excessive heat can be enhanced.

Further, the fuel gas supplied to and partially consumed in the electrolyte electrode assembly 26 is discharged to the oxygen-containing gas supply passage 68 through the fuel gas outlet channels 144a, 144b, 144c. In the structure, even if the oxygen-containing gas before consumption is overheated by reaction with the unconsumed fuel gas remaining in the exhaust fuel gas, the prevention of excessive heat can be enhanced.

Further, in the oxygen-containing gas channel 62, the oxygen-containing gas supplied to and partially consumed in the electrolyte electrode assembly 26 is discharged to the exhaust gas discharge passage 72. In the structure, even if the exhaust gas is overheated by reaction of the unconsumed fuel gas and the unconsumed oxygen-containing gas remaining in the exhaust gas, the excessive heat can be prevented.

Figure 9:
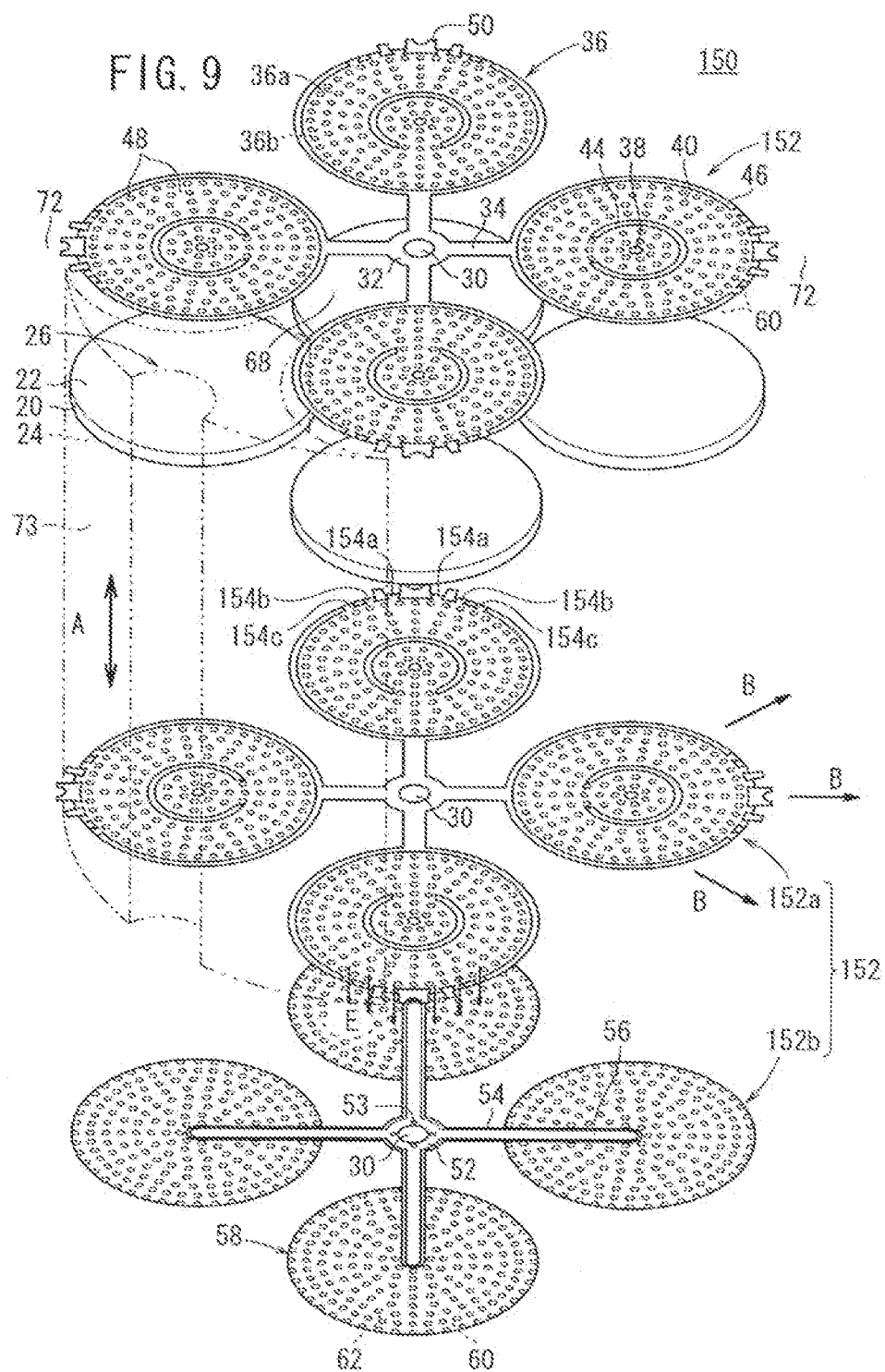
FIG. 9 is an exploded perspective view showing a fuel cell according to a third embodiment of the present invention.

FIG. 9 is an exploded perspective view showing a fuel cell 150 according to a third embodiment of the present invention.

The fuel cell 150 includes separators 152, and each of the separators 152 is formed by joining a first plate 152a and a second plate 152b together. A pair of fuel gas outlet channels 154a, a pair of fuel gas outlet channels 154b, and a pair of fuel gas outlet channels 154c are provided on a surface 36a of each of first sandwiching sections 36 of the first plate 152a. A fuel gas partially consumed in the fuel gas channel 40 is discharged through the fuel gas outlet channels 154a, 154b, 154c.

The fuel gas outlet channels 154a, 154b, 154c are provided on a side opposite to a portion connecting the first sandwiching section 36 and the first bridge 34, on both sides of an extended line L of the first bridge 34 at equal intervals. In the fuel gas outlet channels 154a, 154b, 154c, the cross sectional area on the downstream side in the gas flow direction of the fuel gas along the fuel gas channel 40 is larger than the cross sectional area on the upstream side in the gas flow direction.

Figure 10:
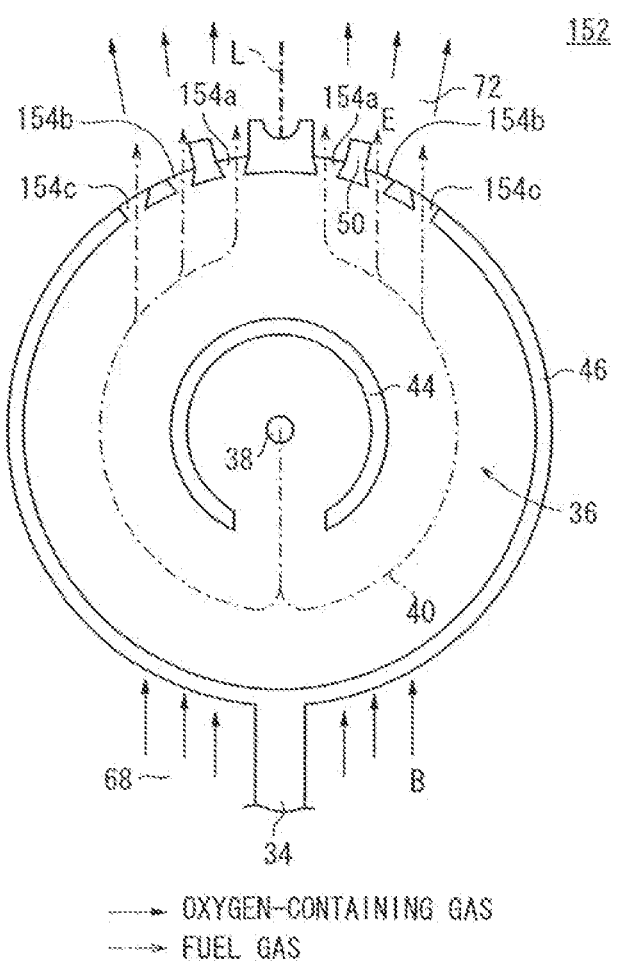
FIG. 10 is a partial view showing a separator of the fuel cell.

The gas flow directions (indicated by arrows E) at the fuel gas outlet channels 154a, 154b, 154c are the same directions as straight lines connecting the first fuel gas supply section 32 and the fuel gas outlet channels 154a, 154b, 154c (see FIG. 10).

In the third embodiment, the oxygen-containing gas flows in the directions indicated by the arrows B, and the gas flow directions at the fuel gas outlet channels 154a, 154b, 154c are the directions indicated by the arrows E. In the structure, the directions indicated by the arrows B and the directions indicated by the arrows E are the same. Thus, the same advantages as in the cases of the first and second embodiments are obtained. For example, it is possible to prevent the other gases such as the oxygen-containing gas and the exhaust gas from flowing around to the anode 24 from the outside of the electrolyte electrode assembly 26. Also, thanks to the negative pressure effect by the flow of the oxygen-containing gas, the exhaust fuel gas is discharged smoothly through the fuel gas outlet channels 154a, 154b, 154c.

Figure 11:
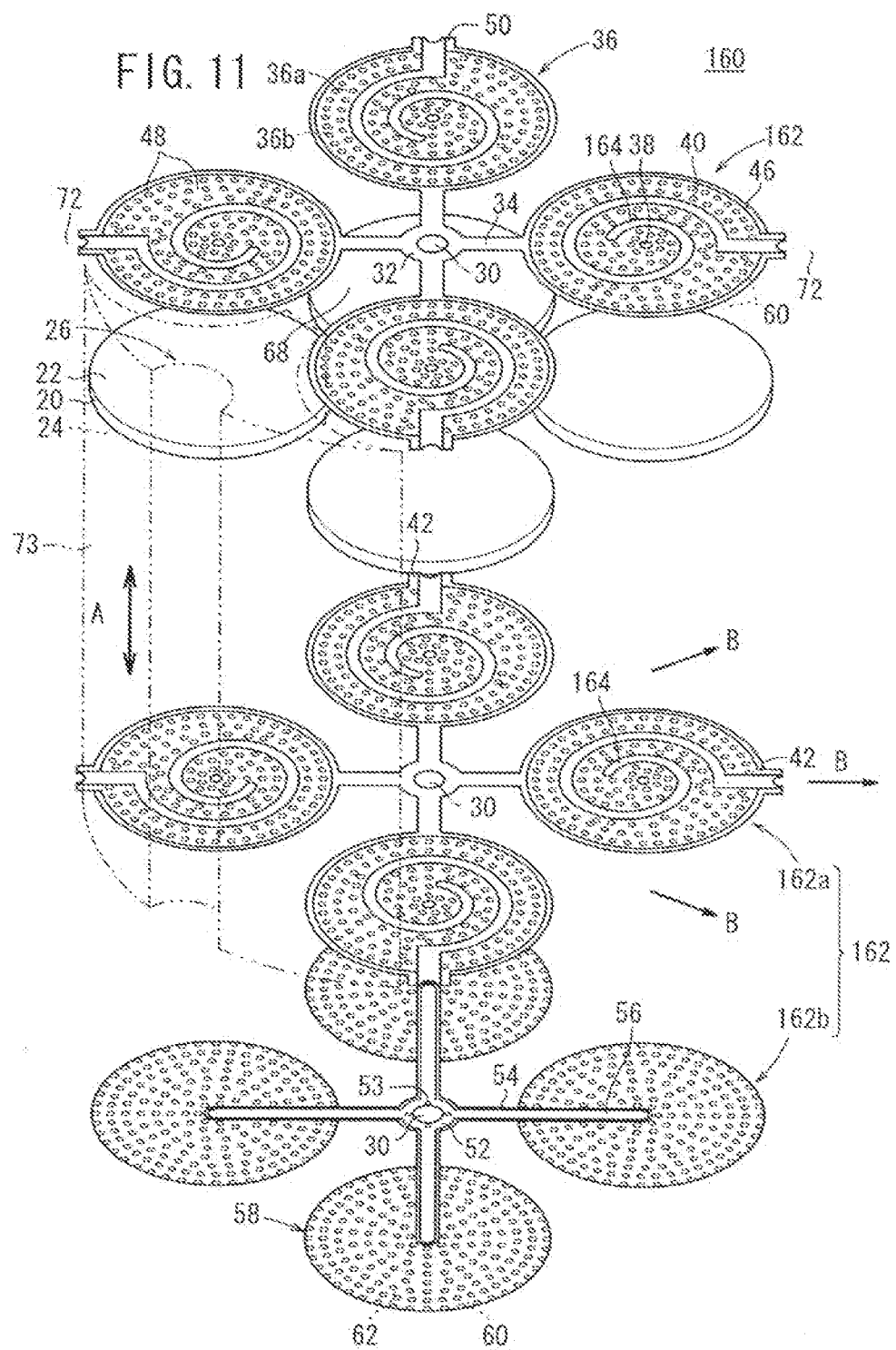
FIG. 11 is an exploded perspective view showing a fuel cell according to a fourth embodiment of the present invention.

FIG. 11 is an exploded perspective view showing a fuel cell 160 according to a fourth embodiment of the present invention.

The fuel cell 160 includes a separator 162, and the separator 162 is formed by joining a first plate 162a and a second plate 162b together. Each of first sandwiching sections 36 of the first plate 162a has a spiral wall 164 on the surface 36a. A fuel gas inlet 38 is formed adjacent to the center of the spiral wall 164.

One fuel gas outlet channel 42 is formed on the surface 36a on a side opposite to a portion connecting the first sandwiching section 36 and the first bridge 34. In the fuel gas outlet channel 42, the cross sectional area on the downstream side of the gas flow direction of the fuel gas along the fuel gas channel 40 is larger than the cross sectional area on the upstream side in the gas flow direction.

In the fourth embodiment, the fuel gas supplied into the fuel gas channel 40 through the fuel gas inlet 38 is supplied to substantially the entire area in the surface 36a by the guidance of the spiral wall 164. Then, the fuel gas is discharged through the single fuel gas outlet channel 42. Thus, in the fourth embodiment, the same advantages as in the cases of the first to third embodiments are obtained.

Figure 12:
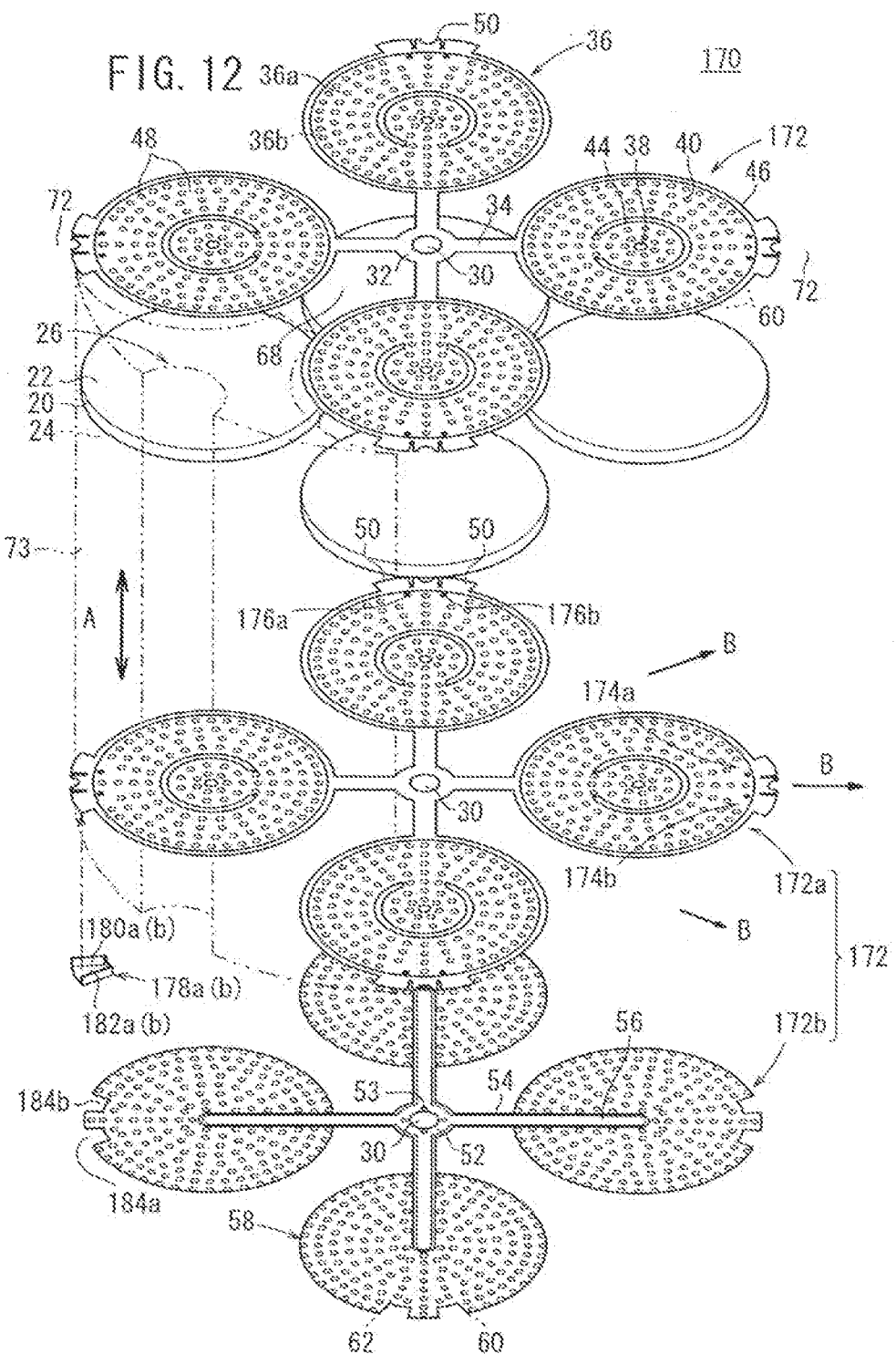
FIG. 12 is an exploded perspective view showing a fuel cell according to a fifth embodiment of the present invention.

FIG. 12 is an exploded perspective view showing a fuel cell 170 according to a fifth embodiment of the present invention.

Figure 13:
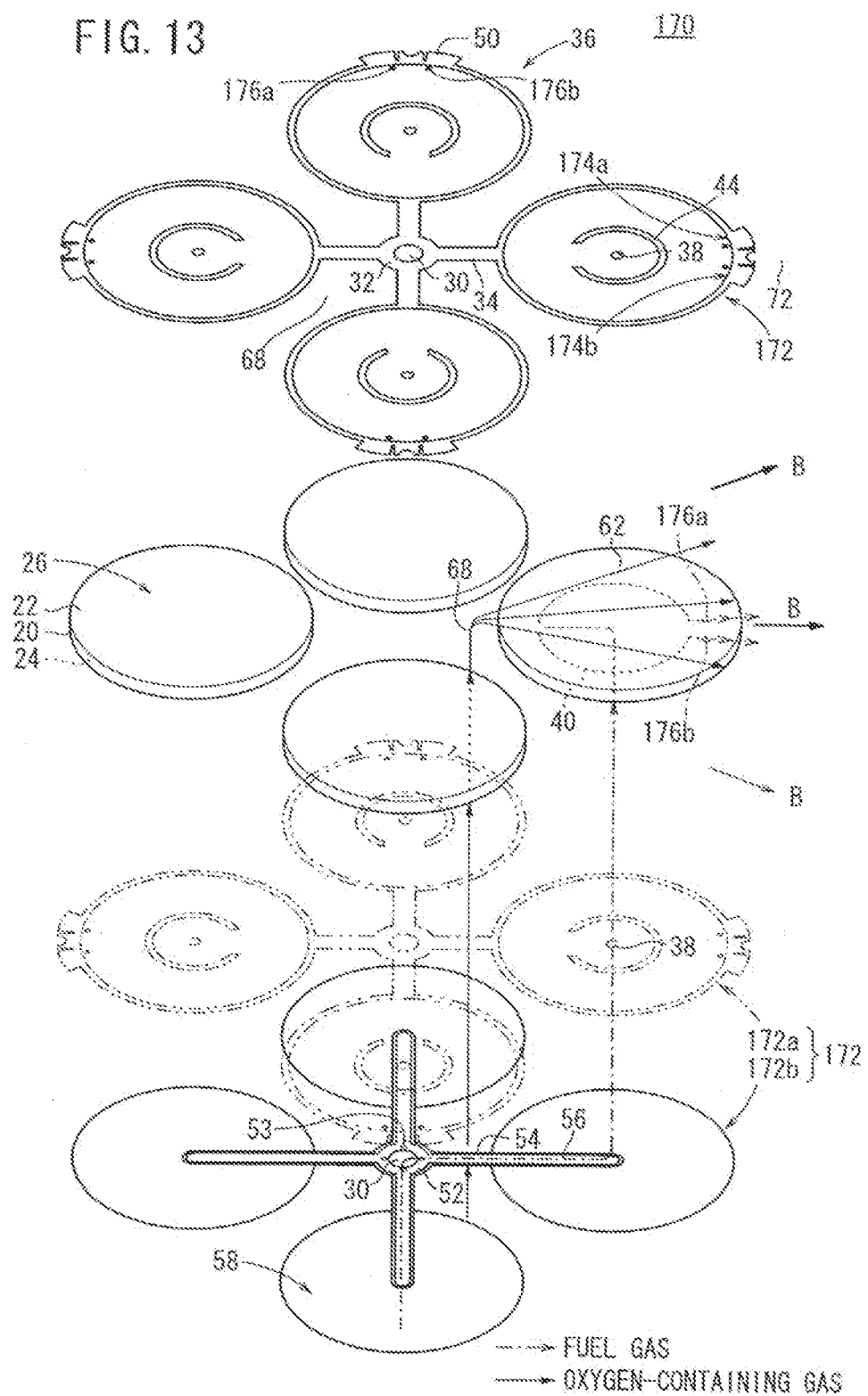
FIG. 13 is a partially exploded perspective view showing gas flows in the fuel cell.

The fuel cell 170 includes a separator 172, and the separator 172 is formed by joining a first plate 172a and a second plate 172b together. Each of first sandwiching sections 36 of the first plate 172a has fuel gas outlet channels 174a, 174b on a side opposite to a portion connecting the first sandwiching section 36 and the first bridge 34, on both sides of an extended line L of the first bridge 34, for discharging the fuel gas partially consumed in the fuel gas channel 40 (FIGS. 12 and 13).

Figure 14:
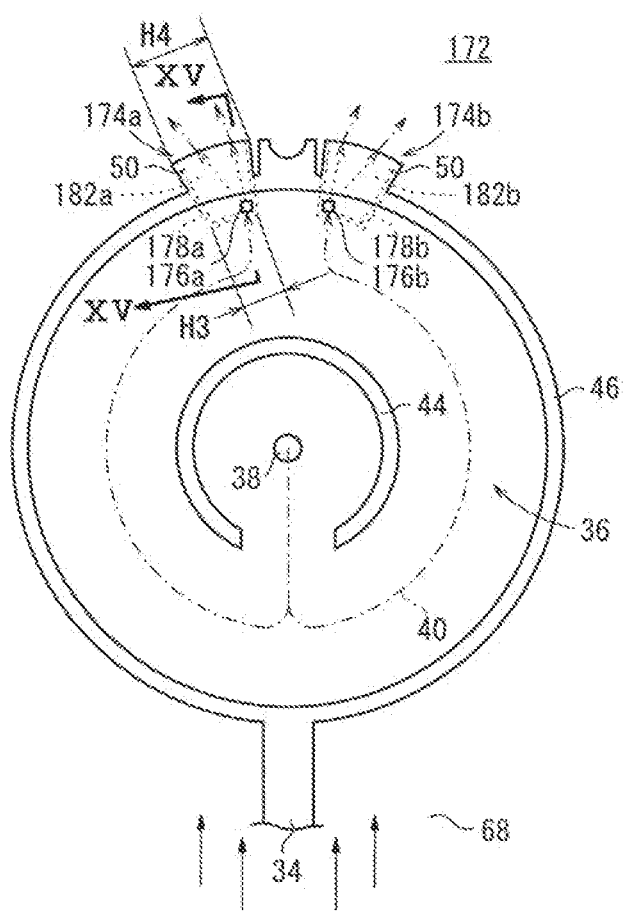
FIG. 14 is a partial view showing a separator of the fuel cell.
Figure 15:
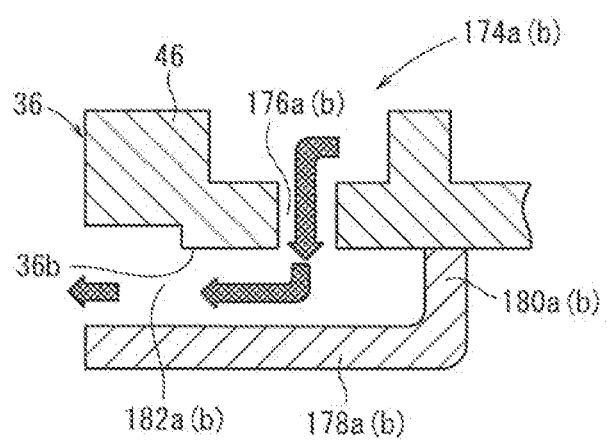
FIG. 15 is a cross sectional view showing the separator, taken along a line XV-XV in FIG. 14.

A continuous outer circumferential protrusion 46 is formed in a surface 36a of each of the first sandwiching sections 36, and the fuel gas outlet channels 174a, 174b include outlet holes 176a, 176b extending through the first sandwiching section 36 at positions inside the outer circumferential protrusion 46 (see FIGS. 14 and 15).

Cover members 178a, 178b are fixed to a surface 36b opposite to the surface 36a of the first sandwiching section 36. Each of the cover members 178a, 178b has a substantially trapezoidal shape in a plan view, and flanges 180a, 180b are provided on three sides excluding an opened front end. The outlet holes 176a, 176b are formed on the surface 36b of the first sandwiching section 36, and the flanges 180a, 180b are fixed to the surface 36b of the first sandwiching section 36 such that the outlet holes 176a, 176b are positioned inside of the flanges 180a, 180b.

Channels 182a, 182b are formed between the cover members 178a, 178b and the surface 36b. Each of the channels 182a, 182b has one end connected to the outlet hole 176a or the outlet hole 176b, and the other end opened to the outside. In the channels 182a, 182b, the cross sectional area is increased from the outlet holes 176a, 176b toward the outside. The width H3 of the channels 182a, 182b at positions adjacent to the outlet holes 176a, 176b side is smaller than the width H4 of the channels 182a, 182b adjacent to the ends opened to the outside (see FIG. 14).

As shown in FIG. 12, the second sandwiching section 58 of the second plate 172b has cutouts 184a, 184b for inserting the cover members 178a, 178b on both sides of the second bridge 54.

In the fifth embodiment, after the fuel gas supplied from the fuel gas inlet 38 to the fuel gas channel 40 is partially consumed in the reaction, the partially consumed fuel gas moves toward the surface 36b through the outlet holes 176a, 176b of the fuel gas outlet channels 174a, 174b, and flows into the channels 182a, 182b formed in the cover members 178a, 178b. Further, the exhaust fuel gas flows through the channels 182a, 182b, and then, the exhaust fuel gas is discharged from each opened end toward the exhaust gas discharge passage 72.

As described above, in the fifth embodiment, the fuel gas outlet channels 174a, 174b include the outlet holes 176a, 176b extending through the first sandwiching sections 36 at positions inside the outer circumferential protrusion 46. In the structure, blowing of the fuel gas to the outside from the fuel gas channel 40 is prevented. Thus, the fuel gas is utilized effectively in the power generation reaction, and improvement in the fuel utilization ratio is achieved advantageously.

Further, gases other than the fuel gas, such as the oxygen-containing gas and the exhaust gas do not flow around to the anode 24 from the outside of the electrolyte electrode assembly 26. Therefore, degradation in the power generation efficiency due to oxidation of the anode 24 is prevented, and improvement in the durability of the separator 172 and the electrolyte electrode assembly 26 is achieved easily.

Further, the fuel gas outlet channels 174a, 174b include the channels 182a, 182b each having one end connected to the outlet hole 176a or the outlet hole 176b, and the other end opened to the outside. In the channels 182a, 182b, the cross sectional area is increased from the outlet holes 176a, 176b toward the outside.

In the structure, gases other than the fuel gas, such as the oxygen-containing gas and the exhaust gas do not flow around to the anode 24 through the channels 182a, 182b from the outside of the electrolyte electrode assembly 26. Therefore, degradation in the power generation efficiency due to oxidation of the anode 24 is prevented, and improvement in the durability of the separator 172 and the electrolyte electrode assembly 26 is achieved easily.

In the channels 182a, 182b, the width H4 at the end on the outer side is larger than the width H3 on the inner side. Further, as necessary, as shown in FIG. 15, the dimension in the stacking direction on the outer side may be larger than the dimension in the stacking direction on the inner side. Further, one of the width and the dimension in the stacking direction on the outer side may be larger than that on the inner side.

Figure 16:
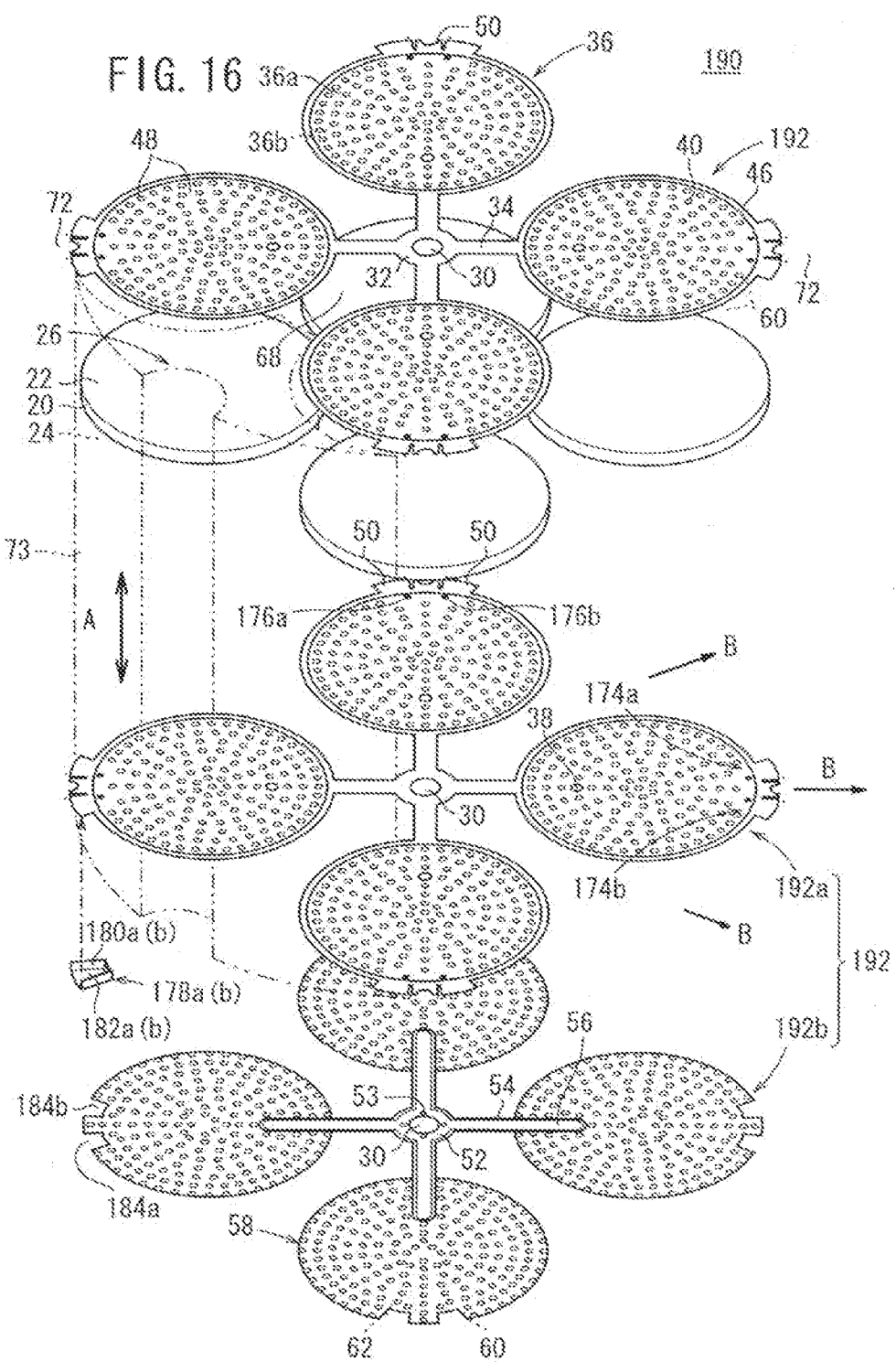
FIG. 16 is an exploded perspective view showing a fuel cell according to a sixth embodiment of the present invention.
Figure 17:
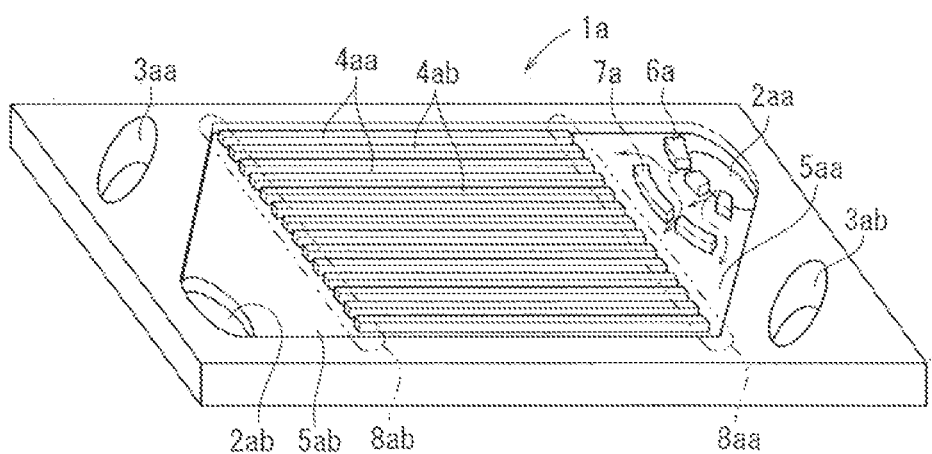
FIG. 17 is a view showing a separator of a fuel cell disclosed in Japanese Laid-Open Patent Publication No. 10-172594.
Figure 18:
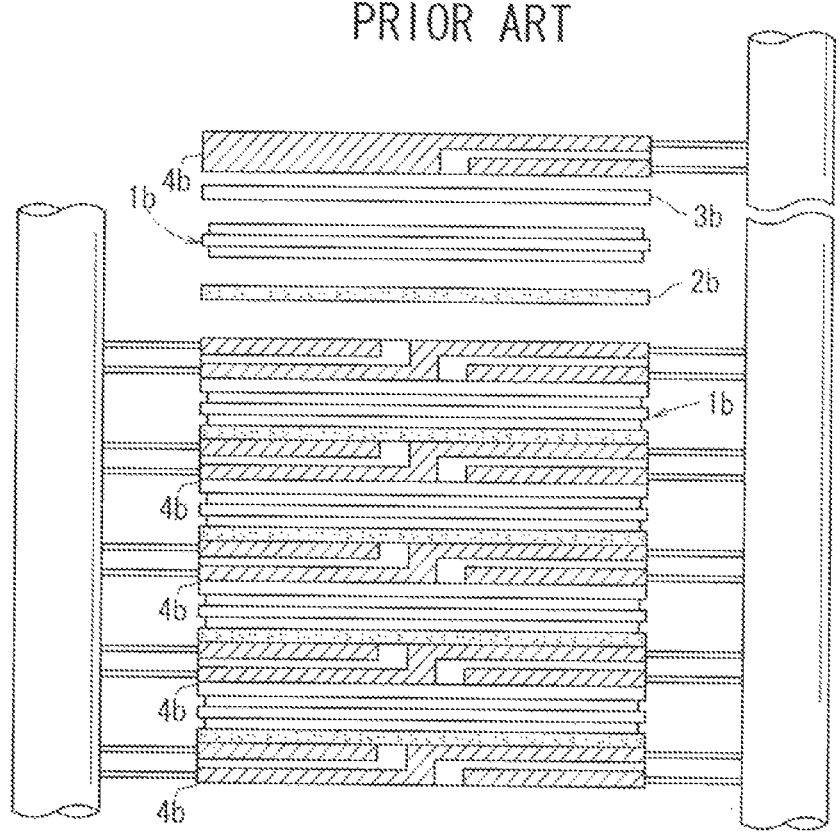
FIG. 18 is a partially cross sectional view showing a fuel cell disclosed in Japanese Laid-Open Patent Publication No. 2005-085520.
Figure 19:
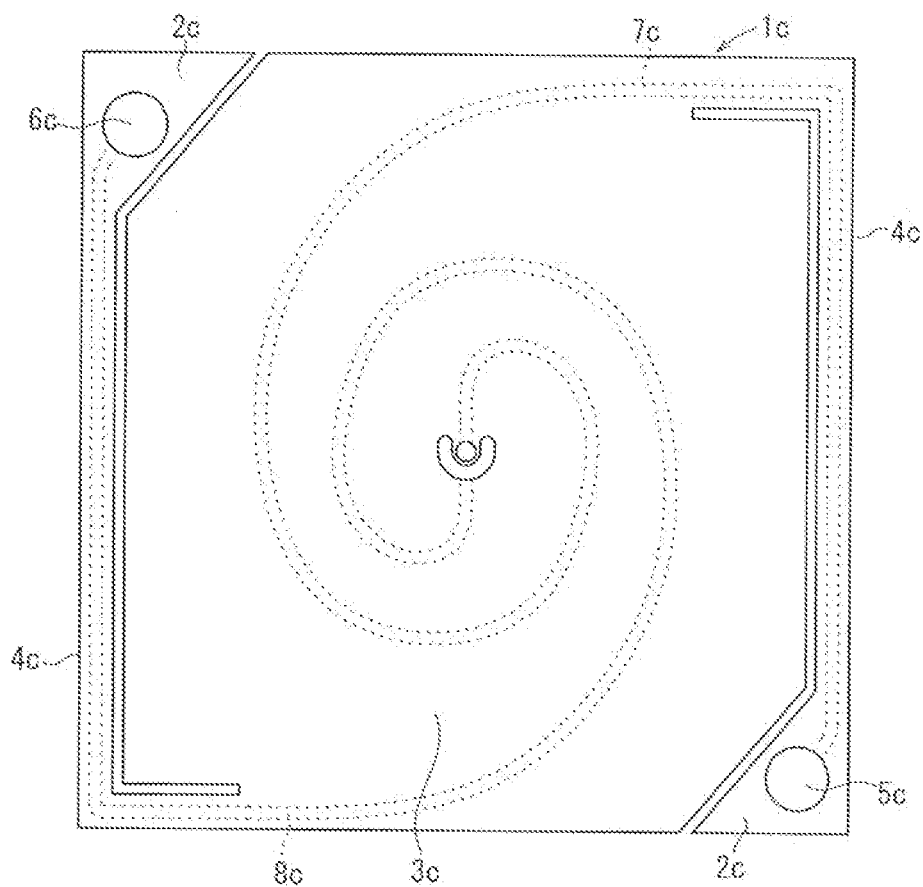
FIG. 19 is a view showing a separator of a fuel cell disclosed in Japanese Laid-Open Patent Publication No. 2006-120589.

FIG. 16 is an exploded perspective view showing a fuel cell 190 according to a sixth embodiment of the present invention.

The constituent elements that are identical to those of the fuel cell 170 according to the fifth embodiment are labeled with the same reference numerals, and description thereof will be omitted.

The fuel cell 190 includes a separator 192, and the separator 192 is formed by joining a first plate 192a and a second plate 192b together. No circular arc wall is provided on the surface 36a of each first sandwiching section 36 of the first plate 192a. A fuel gas inlet 38 is provided at a position deviated toward the inside (in a direction toward the center of the separator 192). In the second plate 192b, the fuel gas supply channel 56 extends inside compared to the center of the second sandwiching section 58 up to a position corresponding to the fuel gas inlet 38.

In the sixth embodiment, the fuel gas inlet 38 is provided deviated inwardly from the center of each first sandwiching section 36. In the structure, without requiring the circular arc wall, the fuel gas flowing from the fuel gas inlet 38 to the fuel gas channel 40 is supplied to the entire surface of the fuel gas channel 40, and discharged to the fuel gas outlet channels 174a, 174b. Thus, in the sixth embodiment, the same advantages as in the case of the fifth embodiment are obtained.

The invention claimed is:

1. A fuel cell formed by stacking electrolyte electrode assemblies and separators alternately in a stacking direction, the electrolyte electrode assemblies each including an anode, a cathode, and an electrolyte interposed between the anode and the cathode, the separators each including:
   a sandwiching section for sandwiching the electrolyte electrode assembly, a fuel gas channel for supplying a fuel gas along an electrode surface of the anode of one electrolyte electrode assembly and an oxygen-containing gas channel for supplying an oxygen-containing gas along an electrode surface of the cathode of another electrolyte electrode assembly being individually formed in the sandwiching section;
   a bridge connected to the sandwiching section, a fuel gas supply channel for supplying the fuel gas to the fuel gas channel being formed in the bridge; and
   a fuel gas supply section connected to the bridge, a fuel gas supply passage extending through the fuel gas supply section in the stacking direction for supplying the fuel gas to the fuel gas supply channel,
   the sandwiching section including:
      a fuel gas inlet for supplying the fuel gas to the fuel gas channel;
      an outer circumferential protrusion protruding toward the fuel gas channel, and contacting an outer circumference of the anode; and
   a plurality of fuel gas outlet channels formed in the outer circumferential protrusion and provided on a side opposite to the portion connecting the sandwiching section and the bridge, wherein the plurality of fuel gas outlet channels includes:
      a first plurality of fuel gas outlet channels provided on a first side of an extended line of the bridge, and
      a second plurality of fuel gas outlet channels provided on a second side of the extended line of the bridge,
   wherein, in each of the plurality of fuel gas outlet channels, a cross sectional area on a downstream side of the fuel gas outlet channel in a gas flow direction of the fuel gas is larger than a cross sectional area on an upstream side of the fuel gas outlet channel in the gas flow direction of the fuel gas.

2. The fuel cell according to claim 1, wherein the sandwiching section further includes a detour channel forming wall protruding toward the fuel gas channel to contact the anode, the detour channel forming wall preventing the fuel gas from flowing straight from the fuel gas inlet to the fuel gas outlet channel.

3. The fuel cell according to claim 1, wherein the gas flow direction at the fuel gas outlet channel intersects a direction of a straight line connecting the fuel gas supply section and the fuel gas outlet channel.

4. The fuel cell according to claim 1, wherein the gas flow direction at the fuel gas outlet channel is the same direction as a straight line connecting the fuel gas supply section and the fuel gas outlet channel.

5. The fuel cell according to claim 1, wherein the fuel gas outlet channel has an outlet hole extending through the sandwiching section inside the outer circumferential protrusion.

6. The fuel cell according to claim 5, wherein the fuel gas outlet channel is provided on a surface opposite to the anode, and includes a channel having one end connected to the outlet hole, and another end opened to the outside; and the cross sectional area of the channel is increased from the outlet hole toward the outside.

7. The fuel cell according to claim 1, wherein the fuel gas supply section is provided at a center of the separator, and a plurality of the electrolyte electrode assemblies are arranged on a circle around the fuel gas supply section.

8. The fuel cell according to claim 1, wherein the sandwiching section has a shape corresponding to each of the electrolyte electrode assemblies, and a plurality of the sandwiching sections are separated from each other.

9. The fuel cell according to claim 1, wherein a plurality of the bridges extend radially outwardly from the fuel gas supply section at equal angular intervals.

10. The fuel cell according to claim 1, wherein, in the separator, the numbers of the sandwiching sections and the bridges correspond to the number of the electrolyte electrode assemblies.

11. The fuel cell according to claim 1, wherein a plurality of projections protruding toward the fuel gas channel to contact the anode are provided on the sandwiching section.

12. The fuel cell according to claim 1, wherein a plurality of projections protruding toward the oxygen-containing gas channel to contact the cathode are provided on the sandwiching section.

13. The fuel cell according to claim 1, wherein an extension for collecting electrical energy generated in the electrolyte electrode assembly or measuring a state of the electrolyte electrode assembly is provided on at least one of the sandwiching sections.

14. The fuel cell according to claim 13, wherein the extension is provided on an outer circumference of the sandwiching section, between the fuel gas outlet channels.

15. The fuel cell according to claim 1, further including:

an exhaust gas discharge section made up of an exhaust gas discharge passage extending in the stacking direction for discharging, as an exhaust gas, the fuel gas and the oxygen-containing gas supplied to the electrolyte electrode assemblies and partially consumed by reaction in the electrolyte electrode assemblies; and an oxygen-containing gas supply section made up of an oxygen-containing gas supply passage extending in the stacking direction for supplying the oxygen-containing gas to the oxygen-containing gas channel before the oxygen-containing gas is supplied to the electrolyte electrode assemblies.

16. The fuel cell according to claim 15, wherein the fuel gas supply section is provided at a center of the separator and a plurality of the oxygen-containing gas supply passages are arranged on a circle around the fuel gas supply section, and the oxygen-containing gas supply passages are arranged between a plurality of the bridges.

17. The fuel cell according to claim 16, wherein the fuel gas supplied to the electrolyte electrode assemblies and partially consumed by reaction in the electrolyte electrode assemblies, is discharged as an exhaust fuel gas through the fuel gas outlet channel to the exhaust gas discharge passages.

18. The fuel cell according to claim 15, wherein the fuel gas supply section is provided at a center of the separator, a plurality of the exhaust gas discharge passages are arranged on a circle around the fuel gas supply section, and the exhaust gas discharge passages are arranged between a plurality of the bridges.

19. The fuel cell according to claim 18, wherein the fuel gas supplied to and partially consumed in the electrolyte electrode assemblies is discharged as an exhaust fuel gas through the fuel gas outlet channel to the oxygen-containing gas supply passages.

20. The fuel cell according to claim 15, wherein the oxygen-containing gas supplied to and partially consumed in the electrolyte electrode assemblies is discharged as an exhaust oxygen-containing gas through the oxygen-containing gas channel to the exhaust gas discharge passage.

21. The fuel cell according to claim 1, wherein the fuel cell is a solid oxide fuel cell.

* * * * *